United States Patent
Dudley et al.

(10) Patent No.: US 12,473,313 B2
(45) Date of Patent: Nov. 18, 2025

(54) THERAPEUTIC COMPOUNDS AND METHODS OF USE THEREOF

(71) Applicant: Regents of the University of Minnesota, Minneapolis, MN (US)

(72) Inventors: Samuel Dudley, Minneapolis, MN (US); Gunda Ingrid Georg, Minneapolis, MN (US); Sudhakar Jakkaraj, Minneapolis, MN (US); Narsihmulu Cheryala, Minneapolis, MN (US)

(73) Assignee: REGENTS OF THE UNIVERSITY OF MINNESOTA, Minneapolis, MN (US)

( * ) Notice: Subject to any disclaimer, the term of this patent is extended or adjusted under 35 U.S.C. 154(b) by 514 days.

(21) Appl. No.: 17/908,767

(22) PCT Filed: Mar. 4, 2021

(86) PCT No.: PCT/US2021/020907
§ 371 (c)(1),
(2) Date: Sep. 1, 2022

(87) PCT Pub. No.: WO2021/178690
PCT Pub. Date: Sep. 10, 2021

(65) Prior Publication Data
US 2023/0127371 A1    Apr. 27, 2023

Related U.S. Application Data

(60) Provisional application No. 62/985,769, filed on Mar. 5, 2020.

(51) Int. Cl.
 *C07F 9/59* (2006.01)
 *A61P 9/06* (2006.01)
 *C07D 211/94* (2006.01)

(52) U.S. Cl.
 CPC ............. *C07F 9/59* (2013.01); *A61P 9/06* (2018.01); *C07D 211/94* (2013.01)

(58) Field of Classification Search
 CPC ............. C07F 9/59; C07D 211/94; A61P 9/06
 See application file for complete search history.

(56) References Cited

U.S. PATENT DOCUMENTS

| | | |
|---|---|---|
| 9,114,133 B2 | 8/2015 | Dudley |
| 2007/0066572 A1 | 3/2007 | Balaraman et al. |
| 2011/0059922 A1 | 3/2011 | Zarling et al. |
| 2012/0214818 A1 | 8/2012 | Dudley |

FOREIGN PATENT DOCUMENTS

WO    2021024208 A1    2/2021

OTHER PUBLICATIONS

Jiang et al., 172(6) Radiation Res. 706-717 (2009) (Year: 2009).*
Jeong, E , et al., "Diastolic Dysfunction", Circ J 79 (3), 470-477 (2015).
Jeong, E , et al., "Role of Mitochondrial Oxidative Stress in Glucose Tolerance, Insulin Resistance, and Cardiac Diastolic Dysfunction", J Am Heart Assoc 5 (5), e003046, doi:10.1161/JAHA.115.003046, 17 pages (2016).
Jeong, E , et al., "Tetrahydrobiopterin improves diastolic dysfunction by reversing changes in myofilament properties", J Mol Cell Cardiol 56, 44-54 (2013).
Liu, M , et al., "Anti-spike IgG causes severe acute lung injury by skewing macrophage responses during acute SARS-CoV infection", JCI Insight 4 (4), e123158, 20 pages (2019).
Owan, T , et al., "Trends in prevalence and outcome of heart failure with preserved ejection fraction", N Engl J Med 355 (3), 251-259 (2006).
Patent Cooperation Treaty , International Search Report and Written Opinion for PCT/US2021/020907, 10 pages, dated Jul. 20, 2021.
PubChem , CID 71470202, 7 pages (create date Jun. 10, 2013; modify date Jun. 19, 2021).
Silberman, G , et al., "Uncoupled cardiac nitric oxide synthase mediates diastolic dysfunction", Circulation 121 (4), 519-528 (2010).

* cited by examiner

*Primary Examiner* — Timothy R Rozof
(74) *Attorney, Agent, or Firm* — Viksnins Harris Padys Malen LLP

(57) ABSTRACT

The invention provides a compound of formula (I): or a salt thereof, wherein A, B, $R^1$, $R^2$, $R^3$ and X have any of the values described in the specification, as well as compositions comprising a compound of formula I. The compounds are useful as therapeutic agents for treating diastolic dysfunction.

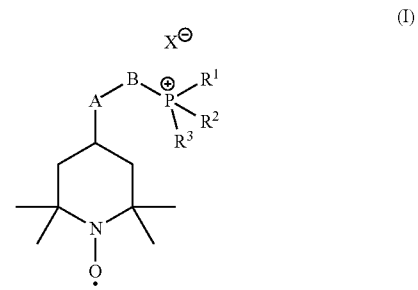

(I)

18 Claims, 8 Drawing Sheets

| | Control | DM-before treatment | DM+Analog 94 |
|---|---|---|---|
| E/e' | 15.4 ± 0.4 | 20.0 ± 1.0* | 17.0 ± 1.5 |
| Body weight (g) | 29.7 ± 0.5 | 42.2 ± 1.4* | 43.6 ± 1.6* |
| Fasting blood glucose (mg/dL) | 128.5 ± 6.3 | 198.3 ± 22.9* | 207.3 ± 10.3* |

|  | Control | DM-before treatment | DM+Analog 58 |
|---|---|---|---|
| E/e' | 15.4 ± 0.4 | 21.9 ± 1.3* | 16.9 ± 1.0# |
| Body weight (g) | 29.7 ± 0.5 | 44.7 ± 1.3* | 45.7 ± 2.1* |
| Fasting blood glucose (mg/dL) | 128.5 ± 6.3 | 205.0 ± 16.3* | 234.7 ± 15.2* |

| | Control (n) | DM (n) | DM+Analog 58 |
|---|---|---|---|
| E/e' | 15.4 ± 0.4 | 21.9 ± 1.3* | 16.9 ± 1.0# |
| Δ Mean fluorescent intensity (ΔMFI = F - $F_0$) | 717 ± 63 (35) | 1823 ± 73* (110) | 851 ± 31* (93) |

THERAPEUTIC COMPOUNDS AND METHODS OF USE THEREOF

PRIORITY

This application claims priority to U.S. Provisional Patent Application No. 62/985,769, which was filed on 5 Mar. 2020. The entire content of this United States Provisional patent application is incorporated herein by reference.

BACKGROUND

Approximately half of the five million heart failure patients in the United States have preserved ejection fraction (HFpEF) (Owan T E, et al. *N Engl J Med.* 2006, 355, 251). Diastolic dysfunction (DD), characterized by the reduced ability of the left ventricle to relax and fill with blood, underlies most HFpEF. At present, there are no specific treatments available for HFpEF (Jeong, E. M., et al. *Circ J.* 2015, 79, 470).

Overproduction of harmful reactive oxygen species (ROS) from mitochondria can lead to oxidative stress in heart tissue and has been shown to contribute toward HFpEF (Silberman, G. A., et al. *Circulation.* 2010, 121, 519; Jeong, E. M., et al. *J Mol Cell Cardiol.* 2013, 56, 44; Jeong, E. M., et al. *J Am Heart Assoc.* 2016, 5 and Liu, M., et al. *JCI Insight.* 2019, 4). The ROS scavenger mitoTEMPO targets mitochondria to convert superoxide into hydrogen peroxide and has been shown to improve diastolic function in mice with HFpEF (Jeong, E. M., et al. *J Am Heart Assoc.* 2016, 5).

Compounds of formula I have been synthesized and tested. Some of the compounds of formula I had higher potency than mitoTEMPO to scavenge mitochondrial ROS. Currently there is a need for agents that are useful for treatment of diastolic dysfunction.

SUMMARY

In one aspect the present invention provides compounds having a significant inhabitation of mitochondrial ROS that are useful for treatment of diastolic dysfunction.

Accordingly, the invention provides a compound of formula I:

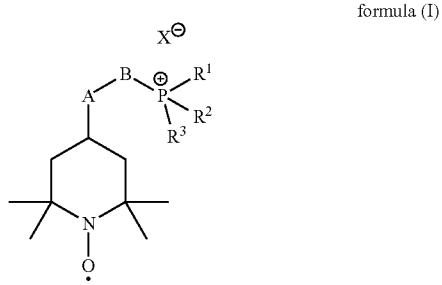

formula (I)

or a pharmaceutically acceptable salt thereof, wherein:

A is selected from —$NR^a$—, —S—, —OC(=O)—, —$NR^aC(=O)$—, —$NR^aC(=S)$—, —$NR^aC(=O)O$—, —$NR^aC(=NR^a)NR^b$—, —$NR^aC(=O)NR^b$—, —$NR^aC(=S)NR^b$—, —C(=O)O—, —C(=O)$NR^a$— and —C(=O)NH(S(O)$_2$)—.

B is ($C_1$-$C_{10}$)alkyl optionally substituted with one or more groups independently selected from the group consisting of halo, —OH, —O—, —S—, nitro and cyano;

X is a suitable counter anion;

$R^1$ is aryl that is optionally substituted with one or more groups independently selected from the group consisting of nitro, carboxy, halo, cyano, heteroaryl, aryl, ($C_1$-$C_6$)alkyl, ($C_3$-$C_6$)cycloalkyl, ($C_1$-$C_6$)alkoxy, ($C_2$-$C_6$)alkenyl, ($C_2$-$C_6$)alkynyl, ($C_1$-$C_6$)alkanoyl, ($C_1$-$C_6$)alkoxycarbonyl, ($C_1$-$C_6$)alkylthio, ($C_2$-$C_6$)alkanoyloxy, —OH, —$NR^aR^b$, —C(=O)NH($C_1$-$C_6$ alkyl)(S(O)$_2R^a$), —C(=O)NH($C_1$-$C_6$ alkyl)(C(=O)$OR^a$), —C(=O)$NR^aR^b$, —OS(O)$_3R^a$, —C(=O)NH(S(O)$_2R^a$), and —C(=O)($C_1$-$C_6$ alkyl), wherein any heteroaryl, aryl, ($C_1$-$C_6$)alkyl, ($C_3$-$C_6$)cycloalkyl, ($C_1$-$C_6$)alkoxy, ($C_2$-$C_6$)alkenyl, ($C_2$-$C_6$)alkynyl, ($C_1$-$C_6$)alkanoyl, ($C_1$-$C_6$)alkoxycarbonyl, ($C_1$-$C_6$)alkylthio and ($C_2$-$C_6$)alkanoyloxy is optionally substituted with one or more groups independently selected from the group consisting of halo, carboxy, —OH and cyano;

$R^2$ is aryl that is optionally substituted with one or more groups independently selected from the group consisting of nitro, carboxy, halo, cyano, heteroaryl, aryl, ($C_1$-$C_6$)alkyl, ($C_3$-$C_6$)cycloalkyl, ($C_1$-$C_6$)alkoxy, ($C_2$-$C_6$)alkenyl, ($C_2$-$C_6$)alkynyl, ($C_1$-$C_6$)alkanoyl, ($C_1$-$C_6$)alkoxycarbonyl, ($C_1$-$C_6$)alkylthio, ($C_2$-$C_6$)alkanoyloxy, —OH, —$NR^aR^b$, —C(=O)NH($C_1$-$C_6$ alkyl)(S(O)$_2R^a$), —C(=O)NH($C_1$-$C_6$ alkyl)(C(=O)$OR^a$), —C(=O)$NR^aR^b$, —OS(O)$_3R^a$, —C(=O)NH(S(O)$_2R^a$), and —C(=O)($C_1$-$C_6$ alkyl), wherein any heteroaryl, aryl, ($C_1$-$C_6$)alkyl, ($C_3$-$C_6$)cycloalkyl, ($C_1$-$C_6$)alkoxy, ($C_2$-$C_6$)alkenyl, ($C_2$-$C_6$)alkynyl, ($C_1$-$C_6$)alkanoyl, ($C_1$-$C_6$)alkoxycarbonyl, ($C_1$-$C_6$)alkylthio and ($C_2$-$C_6$)alkanoyloxy is optionally substituted with one or more groups independently selected from the group consisting of halo, carboxy, —OH and cyano;

$R^3$ is aryl that is optionally substituted with one or more groups independently selected from the group consisting of nitro, carboxy, halo, cyano, heteroaryl, aryl, ($C_1$-$C_6$)alkyl, ($C_3$-$C_6$)cycloalkyl, ($C_1$-$C_6$)alkoxy, ($C_2$-$C_6$)alkenyl, ($C_2$-$C_6$)alkynyl, ($C_1$-$C_6$)alkanoyl, ($C_1$-$C_6$)alkoxycarbonyl, ($C_1$-$C_6$)alkylthio, ($C_2$-$C_6$)alkanoyloxy, —OH, —$NR^aR^b$, —C(=O)NH($C_1$-$C_6$ alkyl)(S(O)$_2R^a$), —C(=O)NH($C_1$-$C_6$ alkyl)(C(=O)$OR^a$), —C(=O)$NR^aR^b$, —OS(O)$_3R^a$, —C(=O)NH(S(O)$_2R^a$), and —C(=O)($C_1$-$C_6$ alkyl), wherein any heteroaryl, aryl, ($C_1$-$C_6$)alkyl, ($C_3$-$C_6$)cycloalkyl, ($C_1$-$C_6$)alkoxy, ($C_2$-$C_6$)alkenyl, ($C_2$-$C_6$)alkynyl, ($C_1$-$C_6$)alkanoyl, ($C_1$-$C_6$)alkoxycarbonyl, ($C_1$-$C_6$)alkylthio and ($C_2$-$C_6$)alkanoyloxy is optionally substituted with one or more groups independently selected from the group consisting of halo, carboxy, —OH and cyano; and each $R^a$ and $R^b$ is independently selected from the group consisting of H, aryl, heteroaryl, ($C_1$-$C_6$)alkyl and ($C_3$-$C_6$)cycloalkyl wherein any aryl, heteroaryl, ($C_1$-$C_6$)alkyl, and ($C_3$-$C_6$)cycloalkyl, is optionally substituted with one or more groups independently selected from the group consisting of halo, nitro, —OH, cyano; or $R^a$ and $R^b$ together with the nitrogen to which they are attached form a 4-10 membered ring heterocycle.

The invention also provides a pharmaceutical composition comprising a compound of formula I or a pharmaceutically acceptable salt thereof, and a pharmaceutically acceptable excipient.

The invention also provides a method for treating diastolic dysfunction in an animal (e.g., a mammal such as a human) comprising administering a compound of formula I or a pharmaceutically acceptable salt thereof to the animal.

The invention also provides a method for treating atrial fibrillation (e.g., diabetes induced atrial fibrillation) in an animal (e.g., a mammal such as a human) comprising administering a compound of formula I or a pharmaceutically acceptable salt thereof to the animal.

The invention also provides a compound of formula I or a pharmaceutically acceptable salt thereof for use in medical therapy.

The invention also provides a compound of formula I or a pharmaceutically acceptable salt thereof for the prophylactic or therapeutic treatment of diastolic dysfunction.

The invention also provides a compound of formula I or a pharmaceutically acceptable salt thereof for the prophylactic or therapeutic treatment of atrial fibrillation (e.g., diabetes induced atrial fibrillation).

The invention also provides the use of a compound of formula I or a pharmaceutically acceptable salt thereof to prepare a medicament for treating diastolic dysfunction in an animal (e.g. a mammal such as a human).

The invention also provides the use of a compound of formula I or a pharmaceutically acceptable salt thereof to prepare a medicament for treating atrial fibrillation (e.g., diabetes induced atrial fibrillation) in an animal (e.g. a mammal such as a human).

The invention also provides processes and intermediates disclosed herein that are useful for preparing a compound of formula I or a salt thereof.

DETAILED DESCRIPTION

Figure 1:
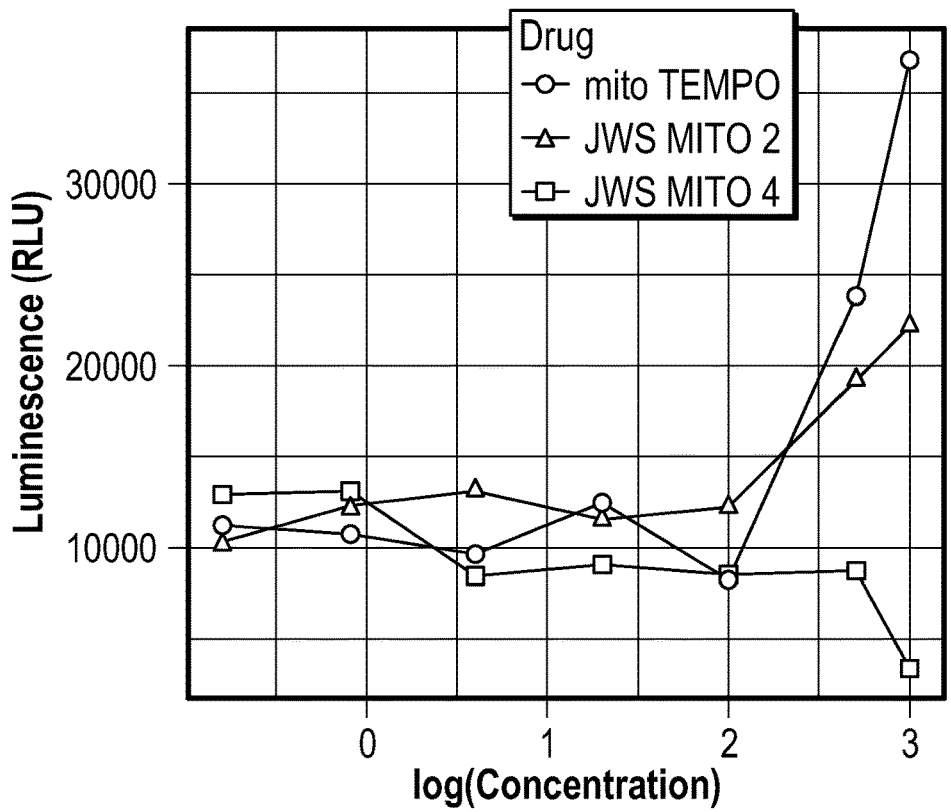
FIG. 1 shows ROS-Glo assay results for mitoTEMPO and compounds 2 and 4.
Figure 2:
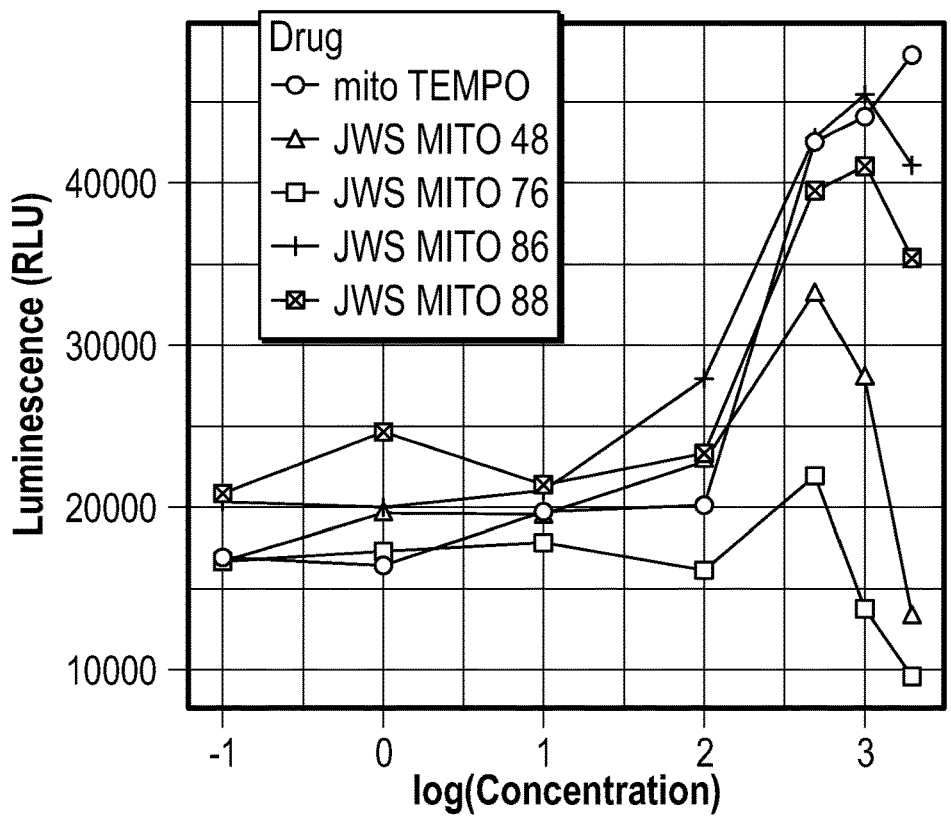
FIG. 2 shows ROS-Glo assay results for mitoTEMPO and compounds 48, 76, 86 and 88.
Figure 3:
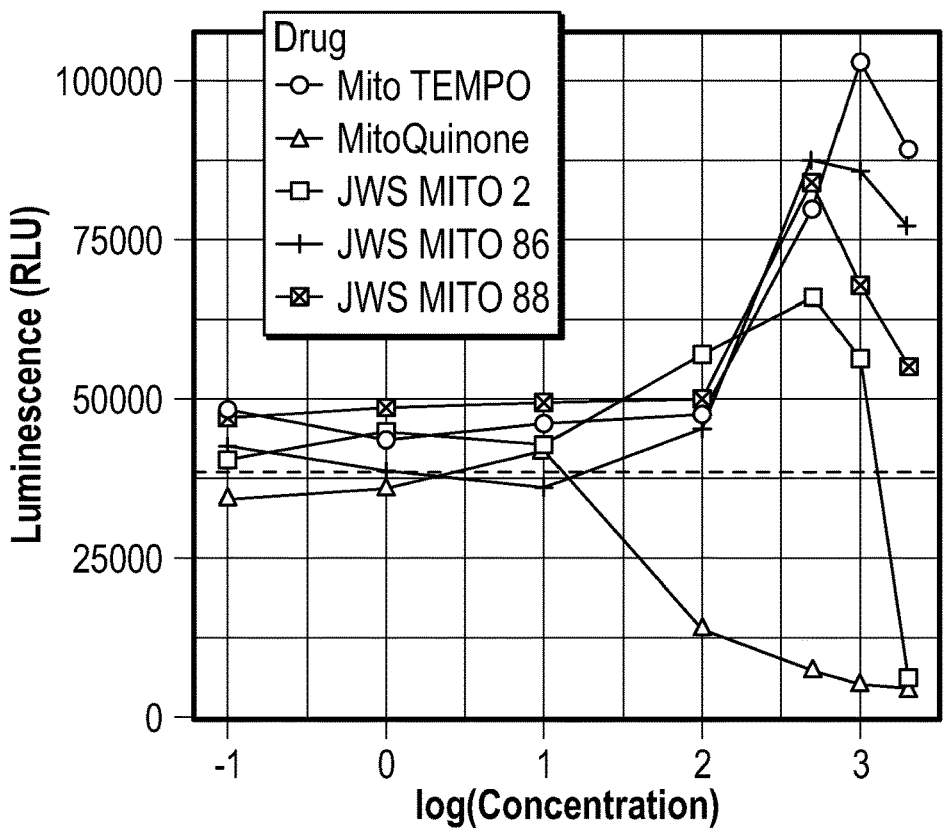
FIG. 3 shows ROS-Glo assay results for mitoTEMPO, mitoQ and compounds 2, 86 and 88.
Figure 4:
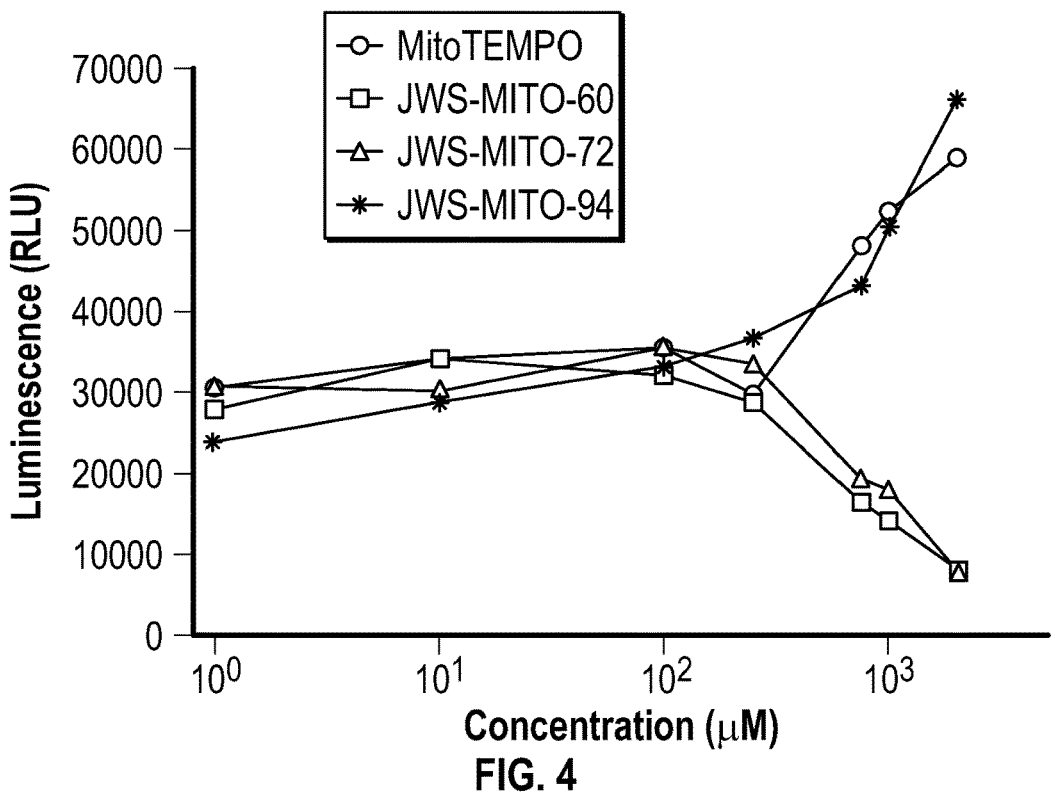
FIG. 4 shows ROS-Glo assay results for mitoTEMPO and compounds 60, 72 and 94.
Figure 5:
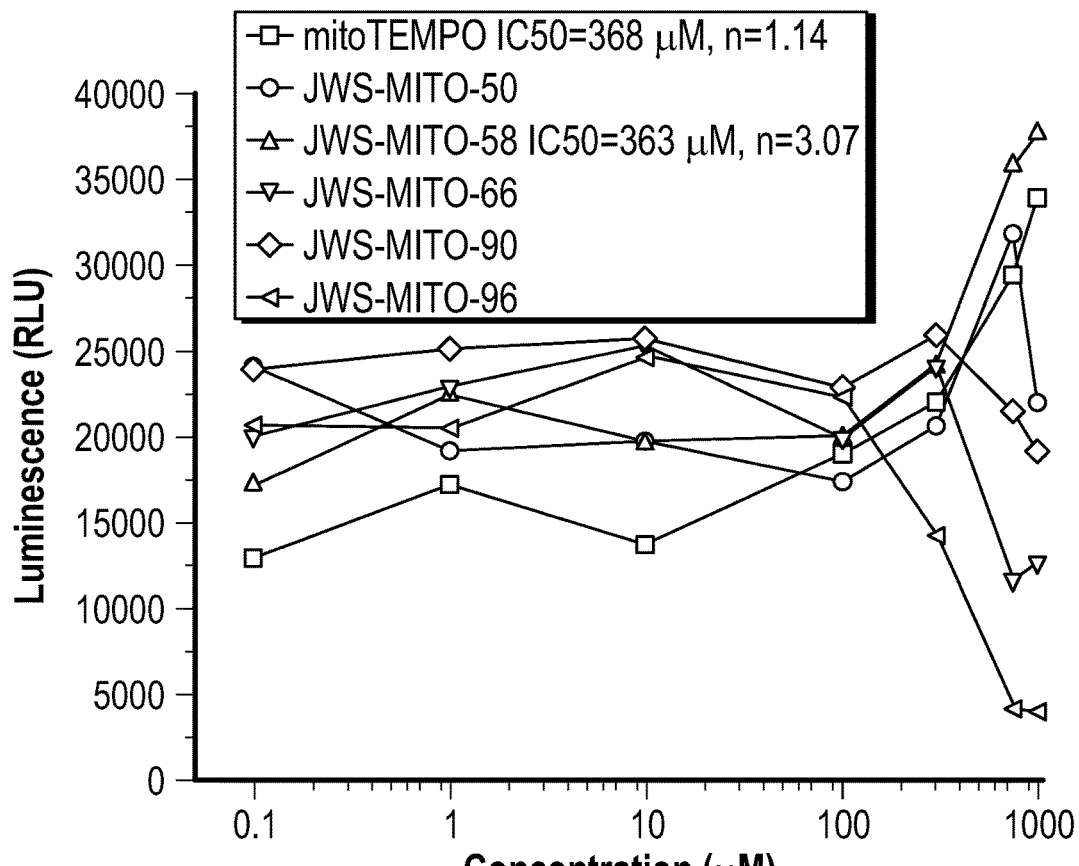
FIG. 5 shows ROS-Glo assay results for mitoTEMPO and compounds 50, 58, 66, 90 and 96. The half maximal inhibitory concentration ($IC_{50}$) of compound 58 is better than that of mitoTEMPO.
Figure 6:
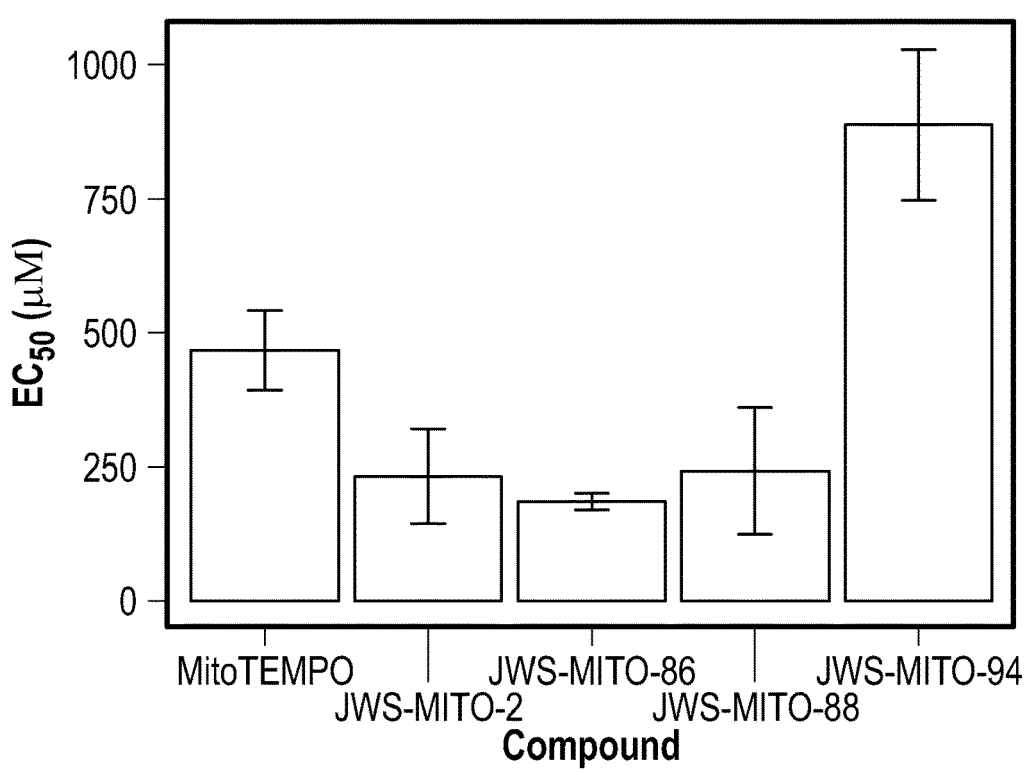
FIG. 6 compares the half maximal effective concentration ($EC_{50}$) of mitoTEMPO and compounds 2, 86, 88 and 94. Compounds 2, 86 and 88 show lower $EC_{50}$s for mitoROS suppression than did mitoTEMPO.

The following definitions are used, unless otherwise described: halo or halogen is fluoro, chloro, bromo, or iodo. Alkyl, alkoxy, alkenyl, alkynyl, etc. denote both straight and branched groups; but reference to an individual radical such as propyl embraces only the straight chain radical, a branched chain isomer such as isopropyl being specifically referred to.

The term "alkyl", by itself or as part of another substituent, means, unless otherwise stated, a straight or branched chain hydrocarbon radical, having the number of carbon atoms designated (i.e., $C_{1-8}$ means one to eight carbons). Examples include $(C_1$-$C_5)$alkyl, $(C_2$-$C_5)$alkyl, $C_1$-$C_6)$alkyl, $(C_2$-$C_6)$alkyl and $(C_3$-$C_6)$alkyl. Examples of alkyl groups include methyl, ethyl, n-propyl, iso-propyl, n-butyl, t-butyl, iso-butyl, sec-butyl, n-pentyl, n-hexyl, n-heptyl, n-octyl, and and higher homologs and isomers.

The term "alkenyl" refers to an unsaturated alkyl radical having one or more double bonds. Examples of such unsaturated alkyl groups include vinyl, 2-propenyl, crotyl, 2-isopentenyl, 2-(butadienyl), 2,4-pentadienyl, 3-(1,4-pentadienyl) and the higher homologs and isomers.

The term "alkynyl" refers to an unsaturated alkyl radical having one or more triple bonds. Examples of such unsaturated alkyl groups ethynyl, 1- and 3-propynyl, 3-butynyl, and higher homologs and isomers.

The term "alkoxy" refers to an alkyl groups attached to the remainder of the molecule via an oxygen atom ("oxy").

The term "alkylthio" refers to an alkyl groups attached to the remainder of the molecule via a thio group.

The term "cycloalkyl" refers to a saturated or partially unsaturated (non-aromatic) all carbon ring having 3 to 8 carbon atoms (i.e., $(C_3$-$C_5)$carbocycle). The term also includes multiple condensed, saturated all carbon ring systems (e.g., ring systems comprising 2, 3 or 4 carbocyclic rings). Accordingly, carbocycle includes multicyclic carbocycles such as a bicyclic carbocycles (e.g., bicyclic carbocycles having about 3 to 15 carbon atoms, about 6 to 15 carbon atoms, or 6 to 12 carbon atoms such as bicyclo[3.1.0]hexane and bicyclo[2.1.1]hexane), and polycyclic carbocycles (e.g. tricyclic and tetracyclic carbocycles with up to about 20 carbon atoms). The rings of the multiple condensed ring system can be connected to each other via fused, spiro and bridged bonds when allowed by valency requirements. For example, multicyclic carbocycles can be connected to each other via a single carbon atom to form a spiro connection (e.g., spiropentane, spiro[4,5]decane, etc.), via two adjacent carbon atoms to form a fused connection (e.g., carbocycles such as decahydronaphthalene, norsabinane, norcarane) or via two non-adjacent carbon atoms to form a bridged connection (e.g., norbornane, bicyclo[2.2.2]octane, etc.). Non-limiting examples of cycloalkyls include cyclopropyl, cyclobutyl, cyclopentyl, cyclohexyl, bicyclo[2.2.1]heptane, pinane, and adamantane.

The term "aryl" as used herein refers to a single all carbon aromatic ring or a multiple condensed all carbon ring system wherein at least one of the rings is aromatic. For example, in certain embodiments, an aryl group has 6 to 20 carbon atoms, 6 to 14 carbon atoms, 6 to 12 carbon atoms, or 6 to 10 carbon atoms. Aryl includes a phenyl radical. Aryl also includes multiple condensed carbon ring systems (e.g., ring systems comprising 2, 3 or 4 rings) having about 9 to 20 carbon atoms in which at least one ring is aromatic and wherein the other rings may be aromatic or not aromatic (i.e., cycloalkyl. The rings of the multiple condensed ring system can be connected to each other via fused, spiro and bridged bonds when allowed by valency requirements. It is to be understood that the point of attachment of a multiple condensed ring system, as defined above, can be at any position of the ring system including an aromatic or a carbocycle portion of the ring. Non-limiting examples of aryl groups include, but are not limited to, phenyl, indenyl, indanyl, naphthyl, 1, 2, 3, 4-tetrahydronaphthyl, anthracenyl, and the like.

The term "heterocycle" refers to a single saturated or partially unsaturated ring that has at least one atom other than carbon in the ring, wherein the atom is selected from the group consisting of oxygen, nitrogen and sulfur; the term also includes multiple condensed ring systems that have at least one such saturated or partially unsaturated ring, which multiple condensed ring systems are further described below. Thus, the term includes single saturated or partially unsaturated rings (e.g., 3, 4, 5, 6 or 7-membered rings) from about 1 to 6 carbon atoms and from about 1 to 3 heteroatoms selected from the group consisting of oxygen, nitrogen and sulfur in the ring. The sulfur and nitrogen atoms may also be present in their oxidized forms. Exemplary heterocycles include but are not limited to azetidinyl, tetrahydrofuranyl and piperidinyl. The term "heterocycle" also includes multiple condensed ring systems (e.g., ring systems comprising 2, 3 or 4 rings) wherein a single heterocycle ring (as defined above) can be condensed with one or more groups selected from cycloalkyl, aryl, and heterocycle to form the multiple condensed ring system. The rings of the multiple condensed ring system can be connected to each other via fused, spiro and bridged bonds when allowed by valency requirements. It is to be understood that the individual rings of the multiple condensed ring system may be connected in any order relative to one another. It is also to be understood that the point of attachment of a multiple condensed ring system (as defined above for a heterocycle) can be at any position of the multiple condensed ring system including a heterocycle, aryl and carbocycle portion of the ring. In one embodiment the term heterocycle includes a 3-15 membered heterocycle. In one embodiment the term heterocycle includes a 3-10 membered heterocycle. In one embodiment the term heterocycle includes a 3-8 membered heterocycle. In one embodiment the term heterocycle includes a 3-7 membered heterocycle. In one embodiment the term heterocycle includes a 3-6 membered heterocycle. In one embodiment the term heterocycle includes a 4-6 membered heterocycle. In one embodiment the term heterocycle includes a 3-10 membered monocyclic or bicyclic heterocycle comprising 1 to 4 heteroatoms. In one embodiment the term heterocycle includes a 3-8 membered monocyclic or bicyclic heterocycle comprising 1 to 3 heteroatoms. In one embodiment the term heterocycle includes a 3-6 membered monocyclic heterocycle comprising 1 to 2 heteroatoms. In one embodiment the term heterocycle includes a 4-6 membered monocyclic heterocycle comprising 1 to 2 heteroatoms. Exemplary heterocycles include, but are not limited to aziridinyl, azetidinyl, pyrrolidinyl, piperidinyl, homopiperidinyl, morpholinyl, thiomorpholinyl, piperazinyl, tetrahydrofuranyl, dihydrooxazolyl, tetrahydropyranyl, tetrahydrothiopyranyl, 1,2,3,4-tetrahydroquinolyl, benzoxazinyl, dihydrooxazolyl, chromanyl, 1,2-dihydropyridinyl, 2,3-dihydrobenzofuranyl, 1,3-benzodioxolyl, 1,4-benzodioxanyl, spiro[cyclopropane-1,1'-isoindolinyl]-3'-one, isoindolinyl-1-one, 2-oxa-6-azaspiro[3.3]heptanyl, imidazolidin-2-one imidazolidine, pyrazolidine, butyrolactam, valerolactam, imidazolidinone, hydantoin, dioxolane, phthalimide, and 1,4-dioxane.

The term "heteroaryl" as used herein refers to a single aromatic ring that has at least one atom other than carbon in the ring, wherein the atom is selected from the group consisting of oxygen, nitrogen and sulfur; "heteroaryl" also includes multiple condensed ring systems that have at least one such aromatic ring, which multiple condensed ring systems are further described below. Thus, "heteroaryl" includes single aromatic rings of from about 1 to 6 carbon atoms and about 1-4 heteroatoms selected from the group consisting of oxygen, nitrogen and sulfur. The sulfur and nitrogen atoms may also be present in an oxidized form provided the ring is aromatic. Exemplary heteroaryl ring systems include but are not limited to pyridyl, pyrimidinyl, oxazolyl or furyl. "Heteroaryl" also includes multiple condensed ring systems (e.g., ring systems comprising 2, 3 or 4 rings) wherein a heteroaryl group, as defined above, is condensed with one or more rings selected from cycloalkyl, aryl, heterocycle, and heteroaryl. It is to be understood that the point of attachment for a heteroaryl or heteroaryl multiple condensed ring system can be at any suitable atom of the heteroaryl or heteroaryl multiple condensed ring system including a carbon atom and a heteroatom (e.g., a nitrogen). Exemplary heteroaryls include but are not limited to pyridyl, pyrrolyl, pyrazinyl, pyrimidinyl, pyridazinyl, pyrazolyl, thienyl, indolyl, imidazolyl, triazolyl, tetrazolyl, oxazolyl, isoxazolyl, thiazolyl, furyl, oxadiazolyl, thiadiazolyl, quinolyl, isoquinolyl, benzothiazolyl, benzoxazolyl, indazolyl, quinoxalyl, and quinazolyl.

The term "alkoxycarbonyl" as used herein refers to a group (alkyl)-O—C(=O)—, wherein the term alkyl has the meaning defined herein.

The term "alkanoyloxy" as used herein refers to a group (alkyl)-C(=O)—O—, wherein the term alkyl has the meaning defined herein.

As used herein, the term "heteroatom" is meant to include oxygen (O), nitrogen (N), sulfur (S) and silicon (Si).

As used herein, the term "protecting group" refers to a substituent that is commonly employed to block or protect a particular functional group on a compound. For example, an "amino-protecting group" is a substituent attached to an amino group that blocks or protects the amino functionality in the compound. Suitable amino-protecting groups include acetyl, trifluoroacetyl, t-butoxycarbonyl (BOC), benzyloxycarbonyl (CBZ) and 9-fluorenylmethylenoxycarbonyl (Fmoc). Similarly, a "hydroxy-protecting group" refers to a substituent of a hydroxy group that blocks or protects the hydroxy functionality. Suitable protecting groups include acetyl and silyl. A "carboxy-protecting group" refers to a substituent of the carboxy group that blocks or protects the carboxy functionality. Common carboxy-protecting groups include phenylsulfonylethyl, cyanoethyl, 2-(trimethylsilyl) ethyl, 2-(trimethylsilyl)ethoxymethyl, 2-(p-toluenesulfonyl) ethyl, 2-(p-nitrophenylsulfenyl)ethyl, 2-(diphenylphosphino)-ethyl, nitroethyl and the like. For a general description of protecting groups and their use, see P. G. M. Wuts and T. W. Greene, Greene's Protective Groups in Organic Synthesis 4$^{th}$ edition, Wiley-Interscience, New York, 2006.

As used herein a wavy line "〰" that intersects a bond in a chemical structure indicates the point of attachment of the bond that the wavy bond intersects in the chemical structure to the remainder of a molecule.

The term "diastolic dysfunction" includes any condition wherein the ventricular chambers of the heart show evidence of impaired relaxation during the diastolic phase of the cardiac cycle. Such impaired relaxation can be evidenced by an increased slope of the end diastolic pressure-volume relationship, impaired movement of the cardiac tissue during diastole (commonly measured by echocardiography or cardiac magnetic resonance imaging), reduced early phase blood velocity across the mitral valve during diastole (E), reduced early phase mitral annular tissue velocity during diastole (e'), or a increase E/e' ratio. Diastolic dysfunction is thought to underlie heart failure with preserved ejection fraction (HFpEF). HFpEF is the condition of heart failure wherein the ventricular systolic function is normal (i.e. when the cardiac left ventricular ejection fraction is greater than or equal to 50%). Major risk factors for this condition include aging, hypertension, diabetes mellitus, and female gender. Diastolic dysfunction often arises before heart failure symptoms and may be asymptomatic. Heart conditions wherein diastolic dysfunction can exist include HFpEF, hypertrophic cardiomyopathy, sarcoidosis, cardiac amyloidosis, and other infiltrative or inflammatory cardiac conditions.

The terms "treat", "treatment", or "treating" to the extent it relates to a disease or condition includes inhibiting the disease or condition eliminating the disease or condition, and/or relieving one or more symptoms of the disease or condition. The terms "treat", "treatment", or "treating" also refer to both therapeutic treatment and/or prophylactic treatment or preventative measures, wherein the object is to prevent or slow down (lessen) an undesired physiological change or disorder, such as, for example, the development or spread of cancer. For example, beneficial or desired clinical results include, but are not limited to, alleviation of symptoms, diminishment of extent of disease or disorder, stabilized (i.e., not worsening) state of disease or disorder, delay or slowing of disease progression, amelioration or palliation of the disease state or disorder, and remission (whether partial or total), whether detectable or undetectable. "Treat", "treatment", or "treating," can also mean prolonging survival as compared to expected survival if not receiving treatment. Those in need of treatment include those already with the disease or disorder as well as those prone to have the disease or disorder or those in which the disease or disorder is to be prevented. In one embodiment "treat", "treatment", or "treating" does not include preventing or prevention, The phrase "therapeutically effective amount" or "effective amount" includes but is not limited to an amount of a compound of the that (i) treats or prevents the particular disease, condition, or disorder, (ii) attenuates, ameliorates, or eliminates one or more symptoms of the particular disease, condition, or disorder, or (iii) prevents or delays the onset of one or more symptoms of the particular disease, condition, or disorder described herein.

The term "mammal" as used herein refers to humans, higher non-human primates, rodents, domestic, cows, horses, pigs, sheep, dogs and cats. In one embodiment, the mammal is a human. The term "patient" as used herein refers to any animal including mammals. In one embodiment, the patient is a mammalian patient. In one embodiment, the patient is a human patient.

The compounds disclosed herein can also exist as tautomeric isomers in certain cases. Although only one delocalized resonance structure may be depicted, all such forms are contemplated within the scope of the invention.

It is understood by one skilled in the art that this invention also includes any compound claimed that may be enriched at any or all atoms above naturally occurring isotopic ratios with one or more isotopes such as, but not limited to, deuterium ($^2$H or D). As a non-limiting example, a —$CH_3$ group may be substituted with —$CD_3$.

The pharmaceutical compositions of the invention can comprise one or more excipients. When used in combination with the pharmaceutical compositions of the invention the term "excipients" refers generally to an additional ingredient that is combined with the compound of formula (I) or the pharmaceutically acceptable salt thereof to provide a corresponding composition. For example, when used in combination with the pharmaceutical compositions of the invention the term "excipients" includes, but is not limited to: carriers, binders, disintegrating agents, lubricants, sweetening agents, flavoring agents, coatings, preservatives, and dyes.

Stereochemical definitions and conventions used herein generally follow S. P. Parker, Ed., McGraw-Hill Dictionary of Chemical Terms (1984) McGraw-Hill Book Company, New York; and Eliel, E. and Wilen, S., "Stereochemistry of Organic Compounds", John Wiley & Sons, Inc., New York, 1994. The compounds of the invention can contain asymmetric or chiral centers, and therefore exist in different stereoisomeric forms. It is intended that all stereoisomeric forms of the compounds of the invention, including but not limited to, diastereomers, enantiomers and atropisomers, as well as mixtures thereof such as racemic mixtures, form part of the present invention. Many organic compounds exist in optically active forms, i.e., they have the ability to rotate the plane of plane-polarized light. In describing an optically active compound, the prefixes D and L, or R and S, are used to denote the absolute configuration of the molecule about its chiral center(s). The prefixes d and l or (+) and (−) are employed to designate the sign of rotation of plane-polarized light by the compound, with (−) or l meaning that the compound is levorotatory. A compound prefixed with (+) or d is dextrorotatory. For a given chemical structure, these stereoisomers are identical except that they are mirror images of one another. A specific stereoisomer can also be referred to as an enantiomer, and a mixture of such isomers is often called an enantiomeric mixture. A 50:50 mixture of enantiomers is referred to as a racemic mixture or a racemate, which can occur where there has been no stereoselection or stereospecificity in a chemical reaction or process. The terms "racemic mixture" and "racemate" refer to an equimolar mixture of two enantiomeric species, devoid of optical activity.

It will be appreciated by those skilled in the art that compounds of the invention having a chiral center may exist in and be isolated in optically active and racemic forms. Some compounds may exhibit polymorphism. It is to be understood that the present invention encompasses any racemic, optically-active, polymorphic, or stereoisomeric form, or mixtures thereof, of a compound of the invention, which possess the useful properties described herein, it being well known in the art how to prepare optically active forms (for example, by resolution of the racemic form by recrystallization techniques, by synthesis from optically-active starting materials, by chiral synthesis, or by chromatographic separation using a chiral stationary phase.

When a bond in a compound formula herein is drawn in a non-stereochemical manner (e.g. flat), the atom to which the bond is attached includes all stereochemical possibilities. When a bond in a compound formula herein is drawn in a defined stereochemical manner (e.g. bold, bold-wedge, dashed or dashed-wedge), it is to be understood that the atom to which the stereochemical bond is attached is enriched in the absolute stereoisomer depicted unless otherwise noted. In one embodiment, the compound may be at least 51% the absolute stereoisomer depicted. In another embodiment, the compound may be at least 60% the absolute stereoisomer depicted. In another embodiment, the compound may be at least 80% the absolute stereoisomer depicted. In another embodiment, the compound may be at least 90% the absolute stereoisomer depicted. In another embodiment, the compound may be at least 95 the absolute stereoisomer depicted. In another embodiment, the compound may be at least 99% the absolute stereoisomer depicted.

Specific values listed below for radicals, substituents, and ranges, are for illustration only; they do not exclude other defined values or other values within defined ranges for the radicals and substituents. It is to be understood that two or more values may be combined. It is also to be understood that the values listed herein below (or subsets thereof) can be excluded.

Specifically, $(C_1-C_6)$alkyl can be methyl, ethyl, propyl, isopropyl, butyl, iso-butyl, sec-butyl, pentyl, 3-pentyl, or hexyl; $(C_3-C_6)$cycloalkyl can be cyclopropyl, cyclobutyl, cyclopentyl, or cyclohexyl; $(C_3-C_6)$cycloalkyl$(C_1-C_6)$alkyl can be cyclopropylmethyl, cyclobutylmethyl, cyclopentylmethyl, cyclohexylmethyl, 2-cyclopropylethyl, 2-cyclobutylethyl, 2-cyclopentylethyl, or 2-cyclohexylethyl; $(C_1-C_6)$alkoxy can be methoxy, ethoxy, propoxy, isopropoxy, butoxy, iso-butoxy, sec-butoxy, pentoxy, 3-pentoxy, or hexyloxy; $(C_2-C_6)$alkenyl can be vinyl, allyl, 1-propenyl, 2-propenyl, 1-butenyl, 2-butenyl, 3-butenyl, 1,-pentenyl, 2-pentenyl, 3-pentenyl, 4-pentenyl, 1-hexenyl, 2-hexenyl, 3-hexenyl, 4-hexenyl, or 5-hexenyl; $(C_2-C_6)$alkynyl can be ethynyl, 1-propynyl, 2-propynyl, 1-butynyl, 2-butynyl, 3-butynyl, 1-pentynyl, 2-pentynyl, 3-pentynyl, 4-pentynyl, 1-hexynyl, 2-hexynyl, 3-hexynyl, 4-hexynyl, or 5-hexynyl; $(C_1-C_6)$alkanoyl can be acetyl, propanoyl or butanoyl; $(C_1-C_6)$alkoxycarbonyl can be methoxycarbonyl, ethoxycarbonyl, propoxycarbonyl, isopropoxycarbonyl, butoxycarbonyl, pentoxycarbonyl, or hexyloxycarbonyl; $(C_1-C_6)$alkylthio can be methylthio, ethylthio, propylthio, isopropylthio, butylthio, isobutylthio, pentylthio, or hexylthio; $(C_2-C_6)$alkanoyloxy can be acetoxy, propanoyloxy, butanoyloxy, isobutanoyloxy, pentanoyloxy, or hexanoyloxy; aryl can be phenyl, indenyl, or naphthyl; and heteroaryl can be furyl, imidazolyl, triazolyl, triazinyl, oxazoyl, isoxazoyl, thiazolyl, isothiazoyl, pyrazolyl, pyrrolyl, pyrazinyl, tetrazolyl, pyridyl, (or its N-oxide), thienyl, pyrimidinyl (or its N-oxide), indolyl, isoquinolyl (or its N-oxide) or quinolyl (or its N-oxide).

In one embodiment, the invention provides, a compound of formula (I):

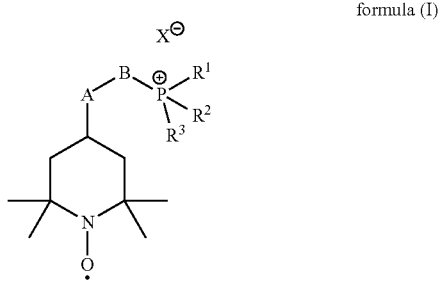

formula (I)

or a pharmaceutically acceptable salt thereof.

A specific value of A is —$NR^aC(=O)$— wherein $R^a$ is independently selected from the group consisting of H, aryl, heteroaryl, $(C_1-C_6)$alkyl and $(C_3-C_6)$cycloalkyl wherein any aryl, heteroaryl, $(C_1-C_6)$alkyl, and $(C_3-C_6)$cycloalkyl, is optionally substituted with one or more groups independently selected from the group consisting of halo, nitro, —OH, cyano.

A specific value of A is —$NHC(=O)$—.

A specific value of B is $(C_1-C_{10})$alkyl.

A specific value of B is methyl, ethyl, n-propyl, n-butyl, n-pentyl or n-hexyl.

A specific value of X is halogen.

A specific value of X is Cl.

A specific value of X is Br.

A specific value of $R^1$ is phenyl optionally substituted with one or more groups independently selected from the group consisting of nitro, carboxy, halo, cyano, heteroaryl, aryl, $(C_1-C_6)$alkyl, $(C_3-C_6)$cycloalkyl, $(C_1-C_6)$alkoxy, $(C_2-C_6)$alkenyl, $(C_2-C_6)$alkynyl, $(C_1-C_6)$alkanoyl, $(C_1-C_6)$alkoxycarbonyl, $(C_1-C_6)$alkylthio, $(C_2-C_6)$alkanoyloxy, —OH, —$NR^aR^b$, —$C(=O)NH(C_1-C_6$ alkyl$)(S(O)_2R^a)$, —$C(=O)NH(C_1-C_6$ alkyl$)(C(=O)OR^a)$, —$C(=O)NR^aR^b$, —$OS(O)_3R^a$, —$C(=O)NH(S(O)_2R^a)$, and —$C(=O)(C_1-C_6$ alkyl$)$, wherein any heteroaryl, aryl, $(C_1-C_6)$alkyl, $(C_3-C_6)$cycloalkyl, $(C_1-C_6)$alkoxy, $(C_2-C_6)$alkenyl, $(C_2-C_6)$alkynyl, $(C_1-C_6)$alkanoyl, $(C_1-C_6)$alkoxycarbonyl, $(C_1-C_6)$alkylthio and $(C_2-C_6)$alkanoyloxy is optionally substituted with one or more groups independently selected from the group consisting of halo, carboxy, —OH and cyano.

A specific value of $R^1$ is 4-fluorophenyl, 3-fluorophenyl, 4-methylphenyl, 4-chlorophenyl, 2-(methoxy)phenyl, 2,4,6-tri(methoxy)phenyl, 3-(methoxy)phenyl or 4-(methoxy)phenyl.

A specific value of $R^1$ is phenyl.

A specific value of $R^2$ is phenyl optionally substituted with one or more groups independently selected from the group consisting of nitro, carboxy, halo, cyano, heteroaryl, aryl, $(C_1-C_6)$alkyl, $(C_3-C_6)$cycloalkyl, $(C_1-C_6)$alkoxy, $(C_2-C_6)$alkenyl, $(C_2-C_6)$alkynyl, $(C_1-C_6)$alkanoyl, $(C_1-C_6)$alkoxycarbonyl, $(C_1-C_6)$alkylthio, $(C_2-C_6)$alkanoyloxy, —OH, —$NR^aR^b$, —$C(=O)NH(C_1-C_6$ alkyl$)(S(O)_2R^a)$, —$C(=O)NH(C_1-C_6$ alkyl$)(C(=O)OR^a)$, —$C(=O)NR^aR^b$, —$OS(O)_3R^a$, —$C(=O)NH(S(O)_2R^a)$, and —$C(=O)(C_1-C_6$ alkyl$)$, wherein any heteroaryl, aryl, $(C_1-C_6)$alkyl, $(C_3-C_6)$cycloalkyl, $(C_1-C_6)$alkoxy, $(C_2-C_6)$alkenyl, $(C_2-C_6)$alkynyl, $(C_1-C_6)$alkanoyl, $(C_1-C_6)$alkoxycarbonyl, $(C_1-C_6)$alkylthio and $(C_2-C_6)$alkanoyloxy is optionally substituted with one or more groups independently selected from the group consisting of halo, carboxy, —OH and cyano.

A specific value of $R^2$ is 4-fluorophenyl, 3-fluorophenyl, 4-methylphenyl, 4-chlorophenyl, 2-(methoxy)phenyl, 2,4,6-tri(methoxy)phenyl, 3-(methoxy)phenyl or 4-(methoxy)phenyl.

A specific value of $R^2$ is phenyl.

A specific value of $R^3$ is phenyl optionally substituted with one or more groups independently selected from the group consisting of nitro, carboxy, halo, cyano, heteroaryl, aryl, $(C_1-C_6)$alkyl, $(C_3-C_6)$cycloalkyl, $(C_1-C_6)$alkoxy, $(C_2-C_6)$alkenyl, $(C_2-C_6)$alkynyl, $(C_1-C_6)$alkanoyl, $(C_1-C_6)$alkoxycarbonyl, $(C_1-C_6)$alkylthio, $(C_2-C_6)$alkanoyloxy, —OH, —$NR^aR^b$, —$C(=O)NH(C_1-C_6$ alkyl$)(S(O)_2R^a)$, —$C(=O)NH(C_1-C_6$ alkyl$)(C(=O)OR^a)$, —$C(=O)NR^aR^b$, —$OS(O)_3R^a$, —$C(=O)NH(S(O)_2R^a)$, and —$C(=O)(C_1-C_6$ alkyl$)$, wherein any heteroaryl, aryl, $(C_1-C_6)$alkyl, $(C_3-C_6)$cycloalkyl, $(C_1-C_6)$alkoxy, $(C_2-C_6)$alkenyl, $(C_2-C_6)$alkynyl, $(C_1-C_6)$alkanoyl, $(C_1-C_6)$alkoxycarbonyl, $(C_1-C_6)$alkylthio and $(C_2-C_6)$alkanoyloxy is optionally substituted with one or more groups independently selected from the group consisting of halo, carboxy, —OH and cyano.

A specific value of $R^3$ is 4-fluorophenyl, 3-fluorophenyl, 4-methylphenyl, 4-chlorophenyl, 2-(methoxy)phenyl, 2,4,6-tri(methoxy)phenyl, 3-(methoxy)phenyl or 4-(methoxy)phenyl.

A specific value of $R^3$ is phenyl.

In one embodiment, the compound or salt is administered intraperitoneally.

Processes for preparing compounds of formula I are provided as further embodiments of the invention and are illustrated by the following procedures in which the meanings of the generic radicals are as given above unless otherwise qualified.

In cases where compounds are sufficiently basic or acidic, a salt of a compound of formula I can be useful as an intermediate for isolating or purifying a compound of formula I. Additionally, administration of a compound of formula I as a pharmaceutically acceptable acid or base salt may be appropriate. Examples of pharmaceutically acceptable salts are organic acid addition salts formed with acids which form a physiological acceptable anion, for example, tosylate, methanesulfonate, acetate, citrate, malonate, tartarate, succinate, benzoate, ascorbate, α-ketoglutarate, and α-glycerophosphate. Suitable inorganic salts may also be formed, including hydrochloride, sulfate, nitrate, bicarbonate, and carbonate salts.

Salts may be obtained using standard procedures well known in the art, for example by reacting a sufficiently basic compound such as an amine with a suitable acid affording a physiologically acceptable anion. Alkali metal (for example, sodium, potassium or lithium) or alkaline earth metal (for example calcium) salts of carboxylic acids can also be made.

The compounds of formula I can be formulated as pharmaceutical compositions and administered to a mammalian host, such as a human patient in a variety of forms adapted to the chosen route of administration, i.e., orally or parenterally, by intravenous, intramuscular, topical or subcutaneous routes.

Thus, the present compounds may be systemically administered, e.g., orally, in combination with a pharmaceutically acceptable vehicle such as an inert diluent or an assimilable edible carrier. They may be enclosed in hard or soft shell gelatin capsules, may be compressed into tablets, or may be incorporated directly with the food of the patient's diet. For oral therapeutic administration, the active compound may be combined with one or more excipients and used in the form of ingestible tablets, buccal tablets, troches, capsules, elixirs, suspensions, syrups, wafers, and the like. Such compositions and preparations should contain at least 0.1% of active compound. The percentage of the compositions and preparations may, of course, be varied and may conveniently be between about 2 to about 60% of the weight of a given unit dosage form. The amount of active compound in such therapeutically useful compositions is such that an effective dosage level will be obtained.

The tablets, troches, pills, capsules, and the like may also contain the following: binders such as gum tragacanth, acacia, corn starch or gelatin; excipients such as dicalcium phosphate; a disintegrating agent such as corn starch, potato starch, alginic acid and the like; a lubricant such as magnesium stearate; and a sweetening agent such as sucrose, fructose, lactose or aspartame or a flavoring agent such as peppermint, oil of wintergreen, or cherry flavoring may be added. When the unit dosage form is a capsule, it may contain, in addition to materials of the above type, a liquid carrier, such as a vegetable oil or a polyethylene glycol. Various other materials may be present as coatings or to otherwise modify the physical form of the solid unit dosage form. For instance, tablets, pills, or capsules may be coated with gelatin, wax, shellac or sugar and the like. A syrup or elixir may contain the active compound, sucrose or fructose as a sweetening agent, methyl and propylparabens as preservatives, a dye and flavoring such as cherry or orange flavor. Of course, any material used in preparing any unit dosage form should be pharmaceutically acceptable and substantially non-toxic in the amounts employed. In addition, the active compound may be incorporated into sustained-release preparations and devices.

The active compound may also be administered intravenously or intraperitoneally by infusion or injection. Solutions of the active compound or its salts can be prepared in water, optionally mixed with a nontoxic surfactant. Dispersions can also be prepared in glycerol, liquid polyethylene glycols, triacetin, and mixtures thereof and in oils. Under ordinary conditions of storage and use, these preparations contain a preservative to prevent the growth of microorganisms.

The pharmaceutical dosage forms suitable for injection or infusion can include sterile aqueous solutions or dispersions or sterile powders comprising the active ingredient which are adapted for the extemporaneous preparation of sterile injectable or infusible solutions or dispersions, optionally encapsulated in liposomes. In all cases, the ultimate dosage form should be sterile, fluid and stable under the conditions of manufacture and storage. The liquid carrier or vehicle can be a solvent or liquid dispersion medium comprising, for example, water, ethanol, a polyol (for example, glycerol, propylene glycol, liquid polyethylene glycols, and the like), vegetable oils, nontoxic glyceryl esters, and suitable mixtures thereof. The proper fluidity can be maintained, for example, by the formation of liposomes, by the maintenance of the required particle size in the case of dispersions or by the use of surfactants. The prevention of the action of microorganisms can be brought about by various antibacterial and antifungal agents, for example, parabens, chlorobutanol, phenol, sorbic acid, thimerosal, and the like. In many cases, it will be preferable to include isotonic agents, for example, sugars, buffers or sodium chloride. Prolonged absorption of the injectable compositions can be brought about by the use in the compositions of agents delaying absorption, for example, aluminum monostearate and gelatin.

Sterile injectable solutions are prepared by incorporating the active compound in the required amount in the appropriate solvent with various of the other ingredients enumerated above, as required, followed by filter sterilization. In the case of sterile powders for the preparation of sterile injectable solutions, the preferred methods of preparation are vacuum drying and the freeze-drying techniques, which yield a powder of the active ingredient plus any additional desired ingredient present in the previously sterile-filtered solutions.

For topical administration, the present compounds may be applied in pure form, i.e., when they are liquids. However, it will generally be desirable to administer them to the skin as compositions or formulations, in combination with a dermatologically acceptable carrier, which may be a solid or a liquid.

Useful solid carriers include finely divided solids such as talc, clay, microcrystalline cellulose, silica, alumina and the like. Useful liquid carriers include water, alcohols or glycols or water-alcohol/glycol blends, in which the present compounds can be dissolved or dispersed at effective levels, optionally with the aid of non-toxic surfactants. Adjuvants such as fragrances and additional antimicrobial agents can be added to optimize the properties for a given use. The resultant liquid compositions can be applied from absorbent pads, used to impregnate bandages and other dressings, or sprayed onto the affected area using pump-type or aerosol sprayers.

Thickeners such as synthetic polymers, fatty acids, fatty acid salts and esters, fatty alcohols, modified celluloses or modified mineral materials can also be employed with liquid carriers to form spreadable pastes, gels, ointments, soaps, and the like, for application directly to the skin of the user.

Examples of useful dermatological compositions which can be used to deliver the compounds of formula I to the skin are known to the art; for example, see Jacquet et al. (U.S. Pat. No. 4,608,392), Geria (U.S. Pat. No. 4,992,478), Smith et al. (U.S. Pat. No. 4,559,157) and Wortzman (U.S. Pat. No. 4,820,508).

Useful dosages of the compounds of formula I can be determined by comparing their in vitro activity, and in vivo activity in animal models. Methods for the extrapolation of effective dosages in mice, and other animals, to humans are known to the art; for example, see U.S. Pat. No. 4,938,949.

The amount of the compound, or an active salt or derivative thereof, required for use in treatment will vary not only with the particular salt selected but also with the route of administration, the nature of the condition being treated and the age and condition of the patient and will be ultimately at the discretion of the attendant physician or clinician.

The desired dose may conveniently be presented in a single dose or as divided doses administered at appropriate intervals, for example, as two, three, four or more sub-doses per day. The sub-dose itself may be further divided, e.g., into a number of discrete loosely spaced administrations, such as multiple inhalations from an insufflator or by application of a plurality of drops into the eye.

The invention will now be illustrated by the following non-limiting Examples.

EXAMPLES

Example 1. Synthesis of 4-Acetamino-(2'-chloro)-2,2,6,6-tetramethyl-1-piperidinyloxy (JWS-MITO-1)

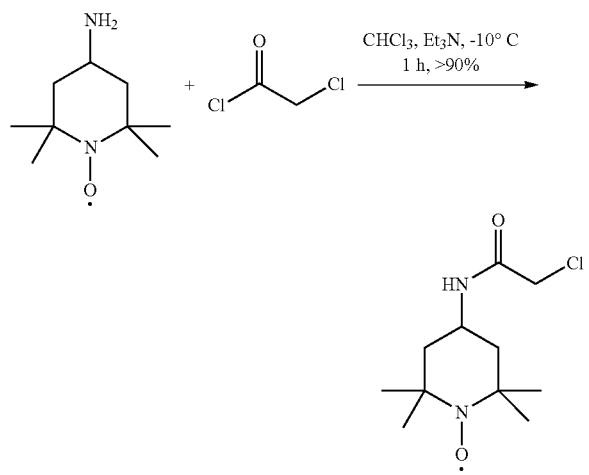

A solution of 4-amino-2,2,6,6-tetramethyl-1-piperidinyloxy, (4.85 g, 28.31 mM) and anhydrous Et$_3$N (9.2 mL, 66 mM) in dry CHCl$_3$ (100 mL) was placed into a 250 ml round bottom flask and cooled to −10° C. Then chloroacetyl chloride (3.2 g, 28 mM) dissolved in dry CHCl$_3$ (10 mL) was added slowly dropwise at −10° C. The reaction solution was stirred for 1 h at 0° C. The resulting dark solution was washed with water (3×50 mL) and dried over sodium sulfate. The CHCl$_3$ was removed under reduced pressure and the residue was stirred in dry ether (50 mL) for 10 min at room temperature and filtered. 4-Acetamino-(2'-chloro)-2,2,6,6-tetramethyl-1-piperidinyloxy was obtained as a dark red solid in 90% yield. 4-Acetamino-(2'-chloro)-2,2,6,6-tetramethyl-1-piperidinyloxy is commercially available. MP 122-124° C. $^1$H NMR (400 MHz, CD$_2$Cl$_2$) δ 7.40 (s, 1H), 6.28 (s, 1H), 4.17 (tdt, J=12.1, 7.9, 4.0 Hz, 1H), 4.04 (s, 2H), 1.88 (ddd, J=11.0, 4.0, 1.8 Hz, 2H), 1.43 (t, J=12.3 Hz, 2H), 1.23 (s, 6H), 1.22 (s, 6H).

Example 2. Synthesis of 3-Bromo-N-(2,2,6,6-tetramethylpiperidin-4-yl-1'-oxy)propenamide (JWS-MITO-14)

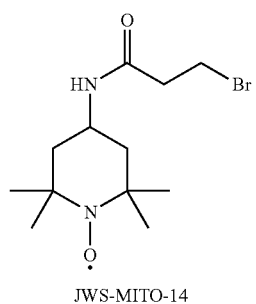 [SMILES: CC1(C)CC(NC(=O)CCBr)CC(C)(C)N1O]

JWS-MITO-14

A solution of 4-amino-2,2,6,6-tetramethyl-1-piperidinyloxy, (2.48 g, 14.48 mM) and anhydrous Et$_3$N (4.72 mL, 33.86 mM) in dry CHCl$_3$ (100 mL) was placed into a 250 ml round bottom flask and cooled to −10° C. Then 3-bromopropanoyl chloride (2.48 g, 14.46 mol) dissolved in dry CHCl$_3$ (10 mL) was added slowly dropwise at −10° C. The reaction solution was stirred for 1 h at 0° C. The resulting dark solution was washed with water (3×50 mL) and dried over sodium sulfate. The CHCl$_3$ was removed under reduced pressure and the residue was purified by silica gel chromatography (98:2 DCM, MeOH) to afford 4.0 g (90%) 3-bromo-N-(1-oxyl-2,2,6,6-tetramethylpiperidin-4-yl)propanamide as a light pinkish solid. MP 147-149° C. $^1$H NMR (400 MHz, CD$_2$Cl$_2$) δ 7.40 (s, 1H), 6.24 (dd, J=16.9, 1.8 Hz, 1H), 6.11 (dd, J=16.9, 10.2 Hz, 1H), 5.63 (dd, J=10.1, 1.8 Hz, 1H), 5.51-5.49 (m, 1H), 4.23 (tdt, J=11.9, 7.8, 3.9 Hz, 1H), 1.90 (ddt, J=12.9, 3.6, 1.7 Hz, 2H), 1.44-1.33 (m, 2H), 1.23 (s, 6H), 1.21 (s, 6H).

Example 3. Synthesis of 4-Bromo-N-(2,2,6,6-tetramethylpiperidin-4-yl-1'-oxy)butanamide (JWS-MITO-34)

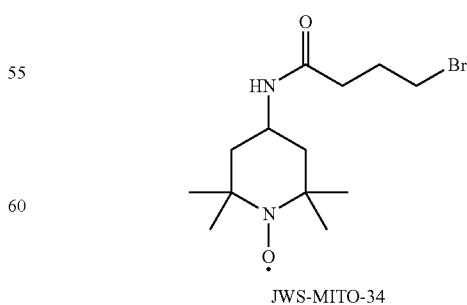

JWS-MITO-34

A solution of 4-amino-2,2,6,6-tetramethyl-1-piperidinyloxy, (2.5 g, 14.59 mM) and anhydrous Et$_3$N (4.6 mL, 33 mM) in dry CHCl$_3$ (100 mL) was placed into a 250 ml round bottom flask and cooled to −10° C. Then 4-bromobutanoyl chloride (2.7 g, 14.55 mM) dissolved in dry CHCl$_3$ (10 mL) was added slowly dropwise at −10° C. The reaction solution was stirred for 1 h at 0° C. The resulting dark solution was washed with water (3×50 mL) and dried over sodium sulfate. The CHCl$_3$ was removed under reduced pressure and the residue was purified by silica gel chromatography (98:2 DCM, MeOH) to afford 2.6 g (56% yield) of 4-bromo-N-(1-oxyl-2,2,6,6-tetramethylpiperidin-4-yl)butanamide as a light pinkish solid. This semi-pure product was carried forward to the next step with no further purification.

Example 4. Synthesis of 5-Bromo-N-(2,2,6,6-tetramethylpiperidin-4-yl-1'-oxy)pentanamide (JWS-MITO-44)

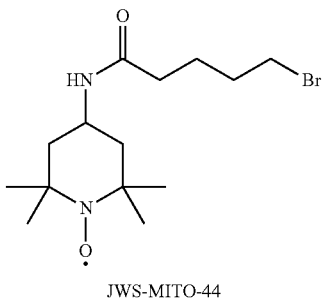 [SMILES: CC1(C)CC(NC(=O)CCCCBr)CC(C)(C)N1O]

JWS-MITO-44

A solution of 4-amino-2,2,6,6-tetramethyl-1-piperidinyloxy, (4.16 g, 24.29 mM) and anhydrous Et$_3$N (7.65 mL, 54.9 mM) in dry CHCl$_3$ (100 mL) was placed into a 250 ml round bottom flask and cooled to −10° C. Then 5-bromopentanoyl chloride (4.83 g, 24.21 mM) dissolved in dry CHCl$_3$ (10 mL) was added slowly dropwise at −10° C. The reaction solution was stirred for 1 h at 0° C. The resulting dark solution was washed with water (3×50 mL) and dried over sodium sulfate. The CHCl$_3$ was removed under reduced pressure and the residue was purified by silica gel chromatography (98:2 DCM, MeOH) afforded 5-bromo-N-(1-oxyl-2,2,6,6-tetramethylpiperidin-4-yl)pentanamide was obtained 7.0 g as a dark red solid in 87% yield. MP 114-116° C. $^1$H NMR (400 MHz, CD$_2$Cl$_2$) δ 7.39 (s, 1H), 4.15 (tdt, J=12.1, 7.9, 3.9 Hz, 1H), 3.47 (t, J=6.6 Hz, 2H), 2.17 (t, J=7.4 Hz, 2H), 2.00-1.83 (m, 4H), 1.82-1.71 (m, 2H), 1.44-1.34 (m, 2H), 1.22 (s, 6H), 1.20 (s, 6H).

Example 5. Synthesis of 6-Bromo-N-(2,2,6,6-tetramethylpiperidin-4-yl-1'-oxy)hexanamide (JWS-MITO-70)

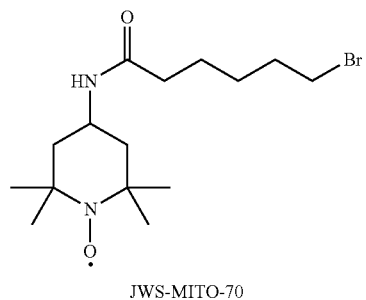 [SMILES: CC1(C)CC(NC(=O)CCCCCBr)CC(C)(C)N1O]

JWS-MITO-70

A solution of 4-amino-2,2,6,6-tetramethyl-1-piperidinyloxy, (4.0 g, 23.35 mM) and anhydrous Et$_3$N (7.65 mL, 54.9 mM) in dry CHCl$_3$ (100 mL) was placed into a 250 ml round bottom flask and cooled to −10° C. Then 6-bromohexanoyl chloride (4.95 g, 23.23 mM) dissolved in dry CHCl$_3$ (10 mL) was added slowly dropwise at −10° C. The reaction solution was stirred for 1 h at 0° C. The resulting dark solution was washed with water (3×50 mL) and dried over sodium sulfate. The CHCl$_3$ was removed under reduced pressure and the residue was purified by silica gel chromatography (98:2 DCM, MeOH) and afforded 7.32 g (90% yield) 5-bromo-N-(1-oxyl-2,2,6,6-tetramethylpiperidin-4-yl)pentanamide as a dark red solid. MP 69-71° C. $^1$H NMR (400 MHz, CD$_2$Cl$_2$) δ 7.39 (s, 1H), 4.15 (tdt, J=12.1, 7.9, 3.9 Hz, 1H), 3.47 (t, J=6.7 Hz, 2H), 2.15 (t, J=7.4 Hz, 2H), 1.96-1.81 (m, 4H), 1.65 (p, J=7.5 Hz, 2H), 1.55-1.43 (m, 2H), 1.37-1.34 (m, 2H), 1.21 (s, 6H), 1.20 (s, 6H).

Example 6. Synthesis of 2,2,6,6-Tetramethyl-4-[[2-(tri-4-methoxyphenyl-phosphonio)acetyl]amino]-1-piperidinyloxy Chloride (JWS-MITO-2)

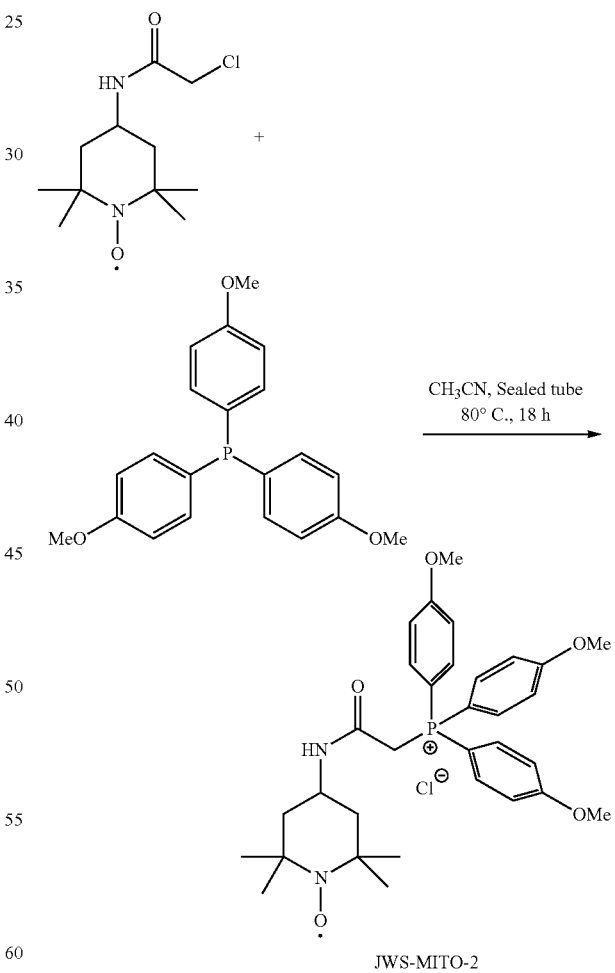

JWS-MITO-2

To 4-acetamino-(2'-chloro)-2,2,6,6-tetramethyl-1-piperidinyloxy (450 mg, 1.82 mM) dissolved in anhydrous acetonitrile (5 mL) was added tris(4-methoxyphenyl)phosphane (1.0 g, 2.83 mM). The reaction mixture was heated to 80° C. in a sealed tube under an inert atmosphere for 18 h.

The solvent was removed under reduced pressure and then the residue was dissolved in a minimum amount of anhydrous acetone (3 to 5 mL). The solution was added to anhydrous diethyl ether (200 mL) dropwise, stirred for 5 minutes and filtered to afford the crude product, which was purified by silica gel column chromatography using (95:5%) dichloromethane and methanol. Then the compound was crystallized from toluene or precipitated (acetone and diethyl ether or DCM and diethyl ether) to afford the tri-4-methoxy compound as a light pink colored solid in 48% yield (525 mg). MP 172-174° C. $^1$H NMR (400 MHz, CD$_2$Cl$_2$) δ 9.81 (d, J=7.4 Hz, 1H), 7.90-7.77 (m, 6H), 7.20-7.13 (m, 6H), 4.83 (s, 1H), 4.79 (s, 1H), 3.93 (s, 10H), 1.56-1.38 (m, 4H), 1.15 (s, 6H), 1.11 (s, 6H). MS (LCMS): C$_{32}$H$_{41}$N$_2$O$_5$P$^{•+}$ requires: 564.27 found 564.34. $^{31}$P NMR δ 20.04.

Example 7. Synthesis of 2,2,6,6-Tetramethyl-4-[[2-(tri-4-methylphenylphosphonio)-acetyl]amino]-1-piperidinyloxy Chloride (JWS-MITO-4)

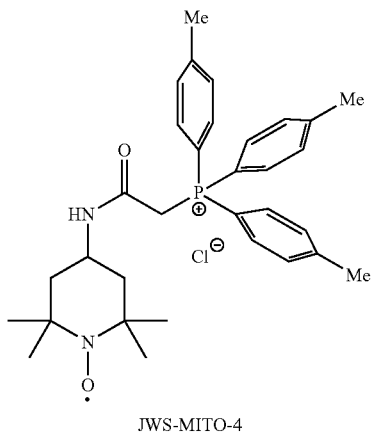 [SMILES: Cc1ccc([P+](CC(=O)NC2CC(C)(C)N(O)C(C)(C)C2)(c2ccc(C)cc2)c2ccc(C)cc2)cc1 ; [Cl-]]

JWS-MITO-4

The compound was prepared according to the procedure for JWS-MITO-2. Light pink colored powder, yield 80%. MP 247-249° C. $^1$H NMR (400 MHz, CD$_2$Cl$_2$) δ 9.72 (d, J=7.4 Hz, 1H), 7.70-7.56 (m, 6H), 7.35 (dd, J=8.2, 3.3 Hz, 6H), 7.27 (s, 1H), 4.77 (s, 1H), 4.74 (s, 1H), 3.72 (dtt, J=11.8, 8.0, 4.0 Hz, 1H), 2.37 (s, 9H), 1.45-1.21 (m, 4H), 1.01 (s, 6H), 0.96 (s, 6H). MS (LCMS): C$_{32}$H$_{41}$N$_2$O$_2$P$^{•+}$ requires: 516.29 found 516.32. $^{31}$P NMR δ 21.39.

Example 8. Synthesis of 2,2,6,6-Tetramethyl-4-[[2-(tri-2-methoxyphenyl-phosphonio)acetyl]amino]-1-piperidinyloxy Chloride (JWS-MITO-6)

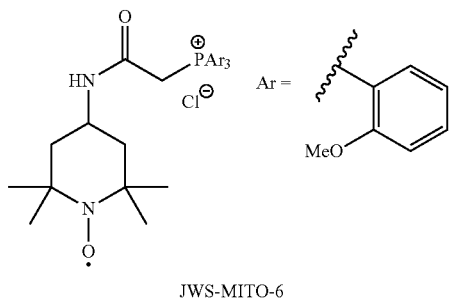

JWS-MITO-6

The compound was prepared according to the procedure for JWS-MITO-2. Light pink colored powder, yield 28%. MP 153-155° C. $^1$H NMR (400 MHz, CD$_2$Cl$_2$) δ 9.61 (s, 1H), 7.58 (td, J=7.9, 7.1, 1.5 Hz, 2H), 7.36-7.22 (m, 4H), 7.06-6.92 (m, 4H), 6.62 (t, J=7.5 Hz, 1H), 6.49-6.34 (m, 1H), 6.26 (td, J=7.2, 3.5 Hz, 1H), 3.86 (s, 1H), 3.82 (s, 1H), 3.61 (s, 10H), 1.35-1.01 (m, 4H), 0.95 (s, 6H), 0.94 (s, 6H). MS (LCMS): C$_{32}$H$_{41}$N$_2$O$_5$P$^{•+}$ requires: 564.66 found 564.90. $^{31}$P NMR δ 18.53.

Example 9. Synthesis of 2,2,6,6-Tetramethyl-4-[[3-(tri-4-methylphenylphosphonio)-propionyl]amino]-1-piperidinyloxy Bromide (JWS-MITO-18)

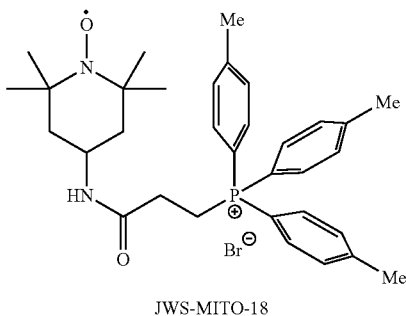 [SMILES: Cc1ccc([P+](CCC(=O)NC2CC(C)(C)N(O)C(C)(C)C2)(c2ccc(C)cc2)c2ccc(C)cc2)cc1 ; [Br-]]

JWS-MITO-18

The compound was prepared according to the procedure for JWS-MITO-2. Light pink color powder, yield 19%. MP 94-96° C. $^1$H NMR (400 MHz, CD$_2$Cl$_2$) δ 8.51 (d, J=7.6 Hz, 1H), 7.63 (dd, J=12.5, 8.1 Hz, 6H), 7.53 (dd, J=8.2, 3.3 Hz, 6H), 7.40 (s, 1H), 4.02 (dtd, J=12.2, 7.9, 3.8 Hz, 1H), 3.60-3.47 (m, 2H), 2.99-2.87 (m, 2H), 2.52 (s, 9H), 1.81-1.54 (m, 4H), 1.18 (s, 6H), 1.16 (s, 6H). MS (LCMS): C$_{33}$H$_{43}$N$_2$O$_2$P$^{•+}$ requires: 530.30 found 530.41. $^{31}$P NMR δ 23.41.

Example 10. Synthesis of 2,2,6,6-Tetramethyl-4-[[4-(tri-4-methoxyphenylphosphonio)-butyryl]amino]-1-piperidinyloxy Bromide (JWS-MITO-40)

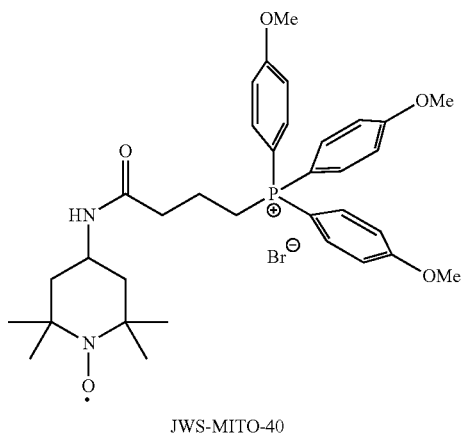 [SMILES: COc1ccc([P+](CCCC(=O)NC2CC(C)(C)N(O)C(C)(C)C2)(c2ccc(OC)cc2)c2ccc(OC)cc2)cc1 ; [Br-]]

JWS-MITO-40

The compound was prepared according to the procedure for JWS-MITO-2. Light pink colored powder, yield 22%. MP 80-82° C. $^1$H NMR (400 MHz, CD$_2$Cl$_2$) δ 7.88 (d, J=7.9

Hz, 1H), 7.70-7.63 (m, 6H), 7.39 (s, 1H), 7.22-7.17 (m, 6H), 4.14 (tdt, J=11.7, 7.8, 4.1 Hz, 1H), 3.94 (s, 9H), 3.47-3.36 (m, 2H), 2.73-2.65 (m, 2H), 1.94 (q, J=7.4 Hz, 2H), 1.86-1.77 (m, 2H), 1.62 (t, J=12.4 Hz, 2H), 1.19 (s, 12H). MS (LCMS): $C_{34}H_{45}N_2O_5P^{•+}$ requires: 592.30 found 592.44. $^{31}P$ NMR δ 21.24.

Example 11. Synthesis of 2,2,6,6-Tetramethyl-4-[[5-(tri-4-methoxyphenylphosphonio)-pentanoyl]amino]-1-piperidinyloxy Bromide (JWS-MITO-50)

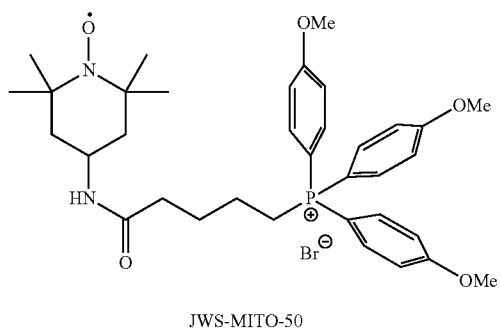 [SMILES: COc1ccc([P+](CCCCC(=O)NC2CC(C)(C)N(O)C(C)(C)C2)(c2ccc(OC)cc2)c2ccc(OC)cc2)cc1 ; [Br-]]

JWS-MITO-50

The compound was prepared according to the procedure for JWS-MITO-2. Light pink colored powder, yield 50%. MP 103-105° C. H NMR (400 MHz, $CD_2C_2$) δ 8.04 (d, J=7.8 Hz, 1H), 7.78-7.66 (m, 6H), 7.40 (s, 1H), 7.22-7.15 (m, 6H), 4.12 (dtd, J=11.8, 8.0, 3.9 Hz, 1H), 3.93 (s, 9H), 3.46-3.39 (m, 2H), 2.55 (t, J=6.9 Hz, 2H), 1.90 (p, J=6.7 Hz, 2H), 1.76-1.56 (m, 6H), 1.18 (d, J=1.2 Hz, 12H). MS (LCMS): $C_{35}H_{47}N_2O_5P^{•+}$ requires: 606.32 found 606.45. $^{31}P$ NMR δ 22.15.

Example 12. Synthesis of 2,2,6,6-Tetramethyl-4-[[3-(tri-4-methoxyphenylphosphonio)-propionyl]amino]-1-piperidinyloxy Bromide (JWS-MITO-16/JWS-MITO-58)

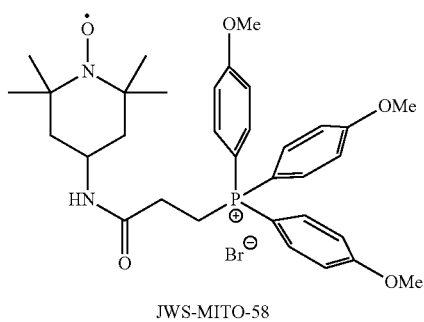 [SMILES: COc1ccc([P+](CCC(=O)NC2CC(C)(C)N(O)C(C)(C)C2)(c2ccc(OC)cc2)c2ccc(OC)cc2)cc1 ; [Br-]]

JWS-MITO-58

The compound was prepared according to the procedure for JWS-MITO-2. Light pink colored powder, yield 47%. MP 93-95° C. $^1H$ NMR (400 MHz, $CD_2Cl_2$) δ 8.42 (d, J=7.7 Hz, 1H), 7.71-7.61 (m, 6H), 7.40 (s, 1H), 7.23-7.18 (m, 6H), 4.04 (dtd, J=12.1, 7.9, 3.9 Hz, 1H), 3.95 (s, 9H), 3.51-3.47 (m, 2H), 2.95-2.85 (m, 2H), 1.83-1.49 (m, 4H), 1.18 (s, 6H), 1.16 (s, 6H). MS (LCMS): $C_{33}H_{43}N_2O_5P^{•+}$ requires: 578.29 found 578.39. $^{31}P$ NMR δ 22.03.

Example 13. Synthesis of 2,2,6,6-Tetramethyl-4-[[5-(tri-4-methylphenylphosphonio)-pentanoyl]amino]-1-piperidinyloxy Bromide (JWS-MITO-60)

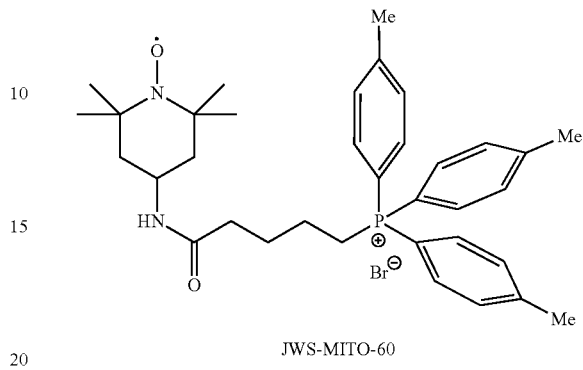

JWS-MITO-60

The compound was prepared according to the procedure for JWS-MITO-2. Light pink colored solid, yield 41%. MP 196-198° C. $^1H$ NMR (400 MHz, $CD_2Cl_2$) δ 8.07 (d, J=7.8 Hz, 1H), 7.77-7.63 (m, 6H), 7.52 (dd, J=8.2, 3.1 Hz, 6H), 7.39 (s, 1H), 4.12 (dtt, J=12.0, 8.0, 4.0 Hz, 1H), 3.59-3.45 (m, 2H), 2.55 (t, J=6.9 Hz, 2H), 2.51 (s, 9H), 1.90 (p, J=6.5 Hz, 2H), 1.82-1.57 (m, 6H), 1.19 (d, J=6.0 Hz, 12H). MS (LCMS): $C_{35}H_{47}N_2O_2P^{•+}$ requires: 558.33 found 558.45. $^{31}P$ NMR δ 23.42.

Example 14. Synthesis of 2,2,6,6-Tetramethyl-4-[[4-(tri-4-methylphenylphosphonio)-butyryl]amino]-1-piperidinyloxy Bromide (JWS-MITO-66)

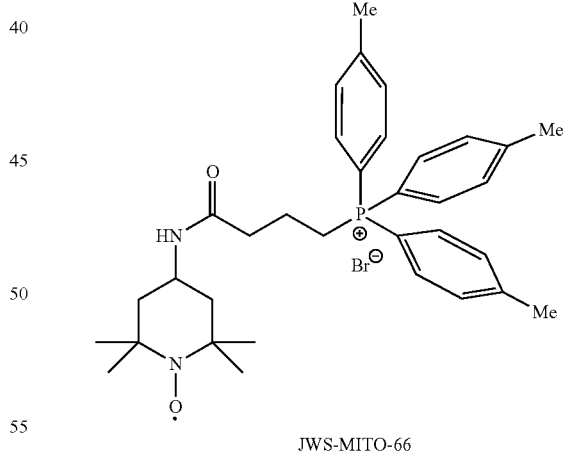

JWS-MITO-66

The compound was prepared according to the procedure for JWS-MITO-2. Light pink colored powder, yield 59%. MP 90-92° C. $^1H$ NMR (400 MHz, $CD_2Cl_2$) δ 7.80 (d, J=7.8 Hz, 1H), 7.54-7.45 (m, 6H), 7.39 (dd, J=8.2, 3.2 Hz, 6H), 7.27 (s, 1H), 4.01 (tdt, J=12.0, 7.8, 3.9 Hz, 1H), 3.32 (ddd, J=16.8, 10.6, 6.5 Hz, 2H), 2.62-2.51 (m, 2H), 2.38 (s, 9H), 1.89-1.73 (m, 2H), 1.73-1.62 (m, 2H), 1.50 (t, J=12.4 Hz, 2H), 1.07 (d, J=2.0 Hz, 12H). MS (LCMS): $C_{34}H_{45}N_2O_2P^{•+}$ requires: 544.32 found 544.42. $^{31}P$ NMR δ 22.59.

Example 15. Synthesis of 2,2,6,6-Tetramethyl-4-[[6-(tri-4-methoxyphenylphosphonio)-hexanoyl]amino]-1-piperidinyloxy Bromide (JWS-MITO-72)

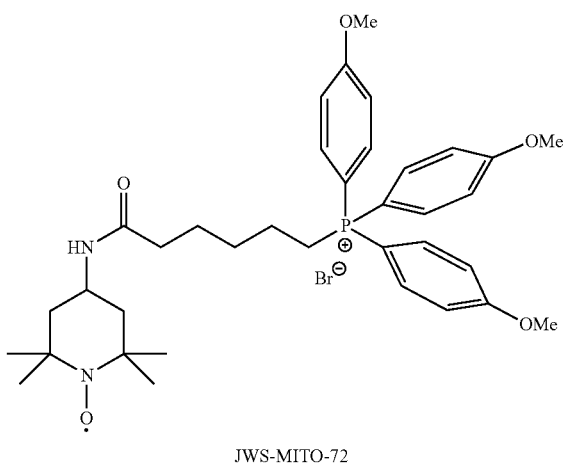

JWS-MITO-72

The compound was prepared according to the procedure for JWS-MITO-2. Light pink colored powder, yield 48%. MP 74-76° C. $^1$H NMR (400 MHz, CD$_2$Cl$_2$) δ 7.73-7.61 (m, 6H), 7.39 (s, 1H), 7.23-7.18 (m, 6H), 7.13 (d, J=7.9 Hz, 1H), 4.21-4.06 (m, 1H), 3.95 (s, 9H), 3.33-3.19 (m, 2H), 2.26 (t, J=7.5 Hz, 2H), 1.83-1.52 (m, 10H), 1.19 (s, 12H). MS (LCMS): C$_{36}$H$_{49}$N$_2$O$_5$P$^{•+}$ requires: 620.33 found 620.46. $^{31}$P NMR δ 21.67.

Example 16. Synthesis of 2,2,6,6-Tetramethyl-4-[[6-(tri-4-methylphenylphosphonio)-hexanoyl]amino]-1-piperidinyloxy Bromide (JWS-MITO-74)

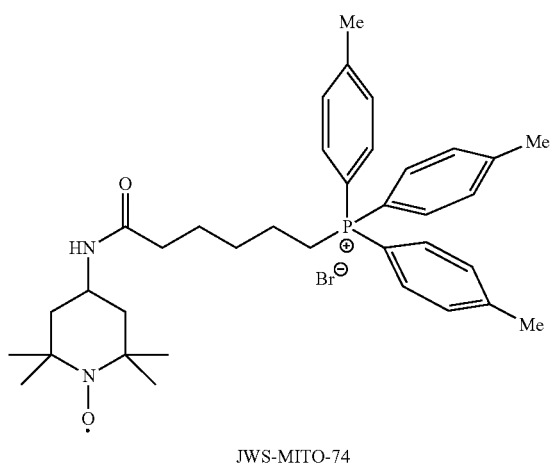

JWS-MITO-74

The compound was prepared according to the procedure for JWS-MITO-2. Light pink color powder, 41%. MP 77-79° C. $^1$H NMR (400 MHz, CD$_2$Cl$_2$) δ 7.69-7.58 (m, 6H), 7.53 (dd, J=8.2, 3.2 Hz, 6H), 7.39 (s, 1H), 7.17 (d, J=8.1 Hz, 1H), 4.13 (tdt, J=12.0, 7.9, 4.0 Hz, 1H), 3.40-3.27 (m, 2H), 2.52 (s, 9H), 2.26 (t, J=7.4 Hz, 2H), 1.82-1.49 (m, 10H), 1.19 (d, J=1.6 Hz, 12H). MS (LCMS): C$_{36}$H$_{49}$N$_2$O$_2$P$^{•+}$ requires: 572.77 found 572.46. $^{31}$P NMR δ 23.00.

Example 17. Synthesis of 2,2,6,6-Tetramethyl-4-[[6-(tri-2-methoxyphenylphosphonio)-hexanoyl]amino]-1-piperidinyloxy Bromide (JWS-MITO-76)

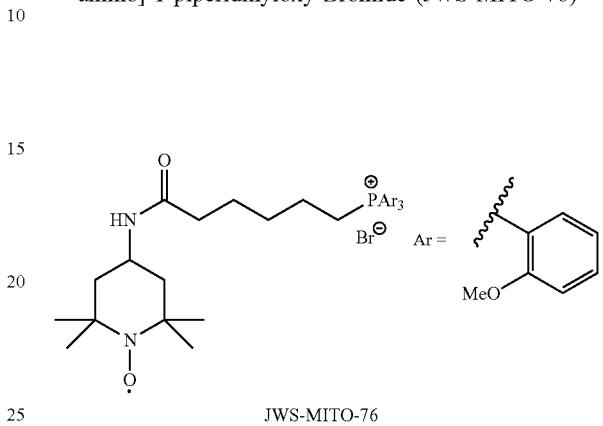

JWS-MITO-76

The compound was prepared according to the procedure for JWS-MITO-2. Light pink colored powder, yield 84%. MP 233-235° C. $^1$H NMR (400 MHz, CD$_2$Cl$_2$) δ 7.81 (tt, J=8.3, 1.4 Hz, 3H), 7.38 (s, 1H), 7.27-7.20 (m, 6H), 7.20-7.16 (m, 3H), 7.06 (d, J=8.0 Hz, 1H), 4.11 (ttd, J=11.9, 7.8, 3.9 Hz, 1H), 3.81 (s, 9H), 3.07 (ddd, J=14.0, 8.8, 5.4 Hz, 2H), 2.26 (t, J=7.1 Hz, 2H), 1.84-1.71 (m, 2H), 1.69-1.43 (m, 8H), 1.17 (s, 12H). MS (LCMS): C$_{36}$H$_{49}$N$_2$O$_5$P$^{•+}$ requires: 620.33 found 620.46. $^{31}$P NMR δ 26.10.

Example 18. Synthesis of 2,2,6,6-Tetramethyl-4-[[6-(tri-2,4,6-trimethoxyphenyl6-phosphonia)hexanoyl]amino]-1-piperidinyloxy Bromide (JWS-MITO-78)

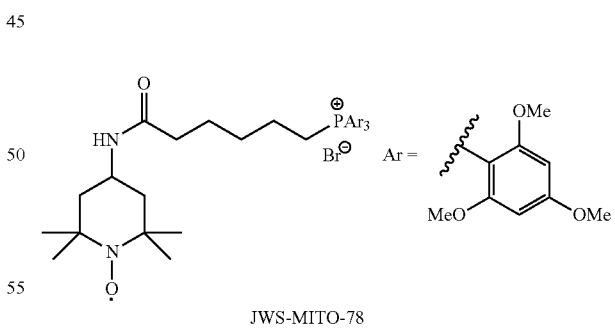

JWS-MITO-78

The compound was prepared according to the procedure for JWS-MITO-2. Light pink colored powder, yield 44%. MP 85-87° C. $^1$H NMR (400 MHz, CD$_2$Cl$_2$) δ 7.39 (s, 1H), 6.45 (d, J=7.9 Hz, 1H), 6.16 (d, J=4.6 Hz, 6H), 4.13 (dtt, J=13.0, 8.9, 4.3 Hz, 1H), 3.90 (s, 9H), 3.64 (s, 18H), 3.12-3.01 (m, 2H), 2.19 (t, J=7.4 Hz, 2H), 1.80 (ddd, J=11.4, 4.2, 1.9 Hz, 2H), 1.64-1.31 (m, 8H), 1.20 (s, 12H). MS (LCMS): C$_{42}$H$_{61}$N$_2$O$_{11}$P$^{•+}$ requires: 800.40 found 800.56. $^{31}$P NMR δ 5.80.

Example 19. Synthesis of 2,2,6,6-Tetramethyl-4-[[6-(tri-3-fluorophenylphosphonio)-hexanoyl]amino]-1-piperidinyloxy Bromide (JWS-MITO-82)

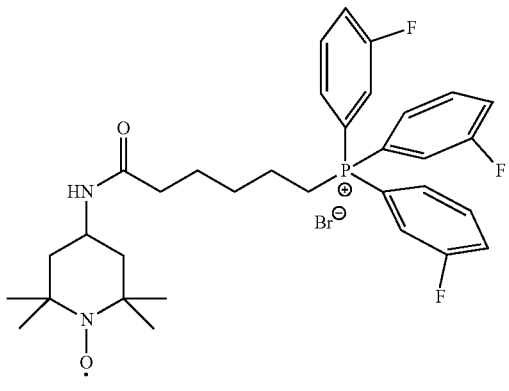

JWS-MITO-82

The compound was prepared according to the procedure for JWS-MITO-2. Light pink colored powder, yield 47%. MP 87-89° C. $^1$H NMR (400 MHz, CD$_2$Cl$_2$) δ 7.89-7.77 (m, 6H), 7.63-7.52 (m, 6H), 7.40 (s, 1H), 7.08 (d, J=8.1 Hz, 1H), 4.13 (tdt, J=11.9, 7.9, 4.0 Hz, 1H), 3.98-3.84 (m, 2H), 2.25 (dd, J=8.6, 6.5 Hz, 2H), 1.89-1.64 (m, 8H), 1.56 (t, J=12.4 Hz, 2H), 1.19 (s, 12H). MS (LCMS). C$_{33}$H$_{40}$F$_3$N$_2$O$_2$P$^{•+}$ requires: 584.27 found 584.39. $^{31}$P NMR δ 25.42.

Example 20. Synthesis of 2,2,6,6-Tetramethyl-4-[[6-(tri-2-methoxyphenylphosphonio)-hexanoyl]amino]-1-piperidinyloxy Bromide (JWS-MITO-84)

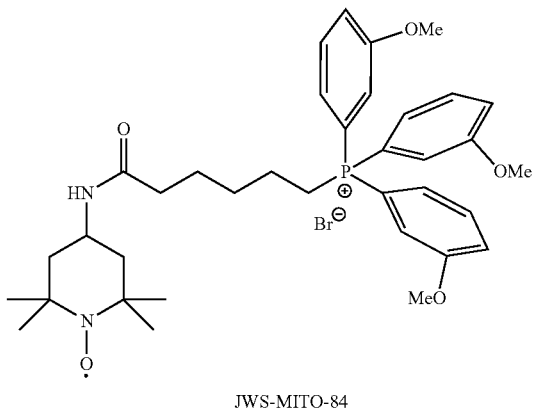

JWS-MITO-84

The compound was prepared according to the procedure for JWS-MITO-2. Light pink colored powder, yield 30%. MP 56-58° C. $^1$H NMR (400 MHz, CD$_2$Cl$_2$) δ 7.65 (td, J=8.0, 4.3 Hz, 3H), 7.39 (s, 1H), 7.38-7.28 (m, 9H), 7.15 (d, J=8.1 Hz, 1H) 4.14 (dtd, J=11.2, 7.6, 7.1, 3.5 Hz, 1H), 3.92 (s, 9H), 3.69-3.57 (m, 2H), 2.25 (t, J=7.6 Hz, 2H), 1.88-1.49 (m, 10H), 1.20 (d, J=1.5 Hz, 12H). MS (LCMS). C$_{36}$H$_{49}$N$_2$O$_5$P$^{•+}$ requires: 620.33 found 620.45. $^{31}$P NMR δ 25.30.

Example 21. Synthesis of 2,2,6,6-Tetramethyl-4-[[6-(tri-4-fluorophenylphosphonio)-hexanoyl]amino]-1-piperidinyloxy Bromide (JWS-MITO-86)

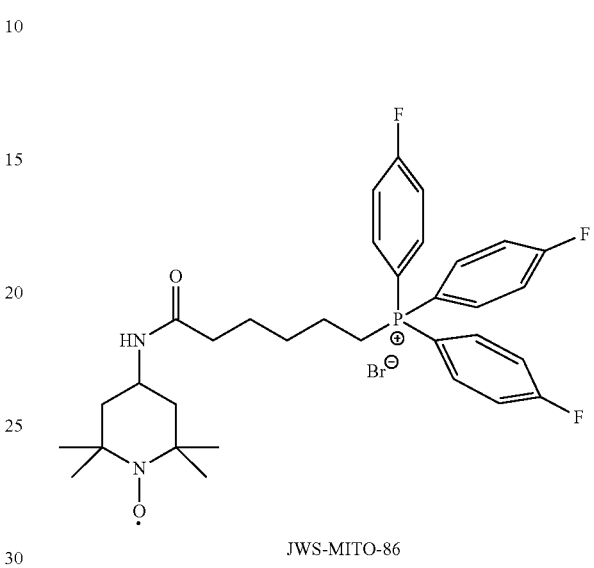

JWS-MITO-86

The compound was prepared according to the procedure for JWS-MITO-2. Light pink colored powder, yield 57%. MP 67-69° C. $^1$H NMR (400 MHz, CD$_2$Cl$_2$) δ 7.91 (m, 6H), 7.47 (m, 6H), 7.39 (s, 1H), 7.09 (d, J=8.0 Hz, 1H), 4.24-4.04 (m, 1H), 3.82-3.67 (m, 2H), 2.26-2.22 (m, 2H), 1.85-1.54 (m, 10H), 1.20 (s, 12H). MS (LCMS): C$_{33}$H$_{40}$F$_3$N$_2$O$_2$P$^{•+}$ requires: 584.27 found 584.43. $^{31}$P NMR δ 24.01.

Example 22. Synthesis of 2,2,6,6-Tetramethyl-4-[[2-(tri-2,4,6-trimethoxyphenyl(2-phosphonia))acetyl]amino]-1-piperidinyloxy Chloride (JWS-MITO-88)

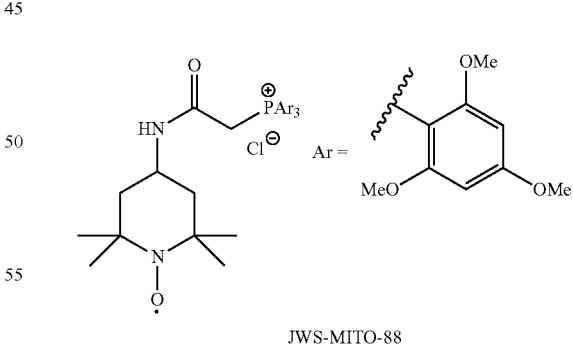

JWS-MITO-88

The compound was prepared according to the procedure for JWS-MITO-2. Light pink colored powder, yield 40. MP 222-224° C. $^1$H NMR (400 MHz, CD$_2$Cl$_2$) δ 8.27 (d, J=7.6 Hz, 1H), 7.39 (s, 1H), 6.15 (d, J=4.8 Hz, 6H), 5.37 (s, 1H), 4.47 (d, J=15.7 Hz, 2H), 3.88 (s, 9H), 3.69 (s, 18H), 1.72-1.35 (m, 4H), 1.16 (s, 6H), 1.11 (s, 6H). MS (LCMS). C$_{38}$H$_{53}$N$_2$O$_{11}$P$^{•+}$ requires: 744.33 found 744.29. $^{31}$P NMR δ 0.68.

Example 23. Synthesis of 2,2,6,6-Tetramethyl-4-[[5-(tri-2,4,6-trimethoxyphenyl5-phosphonia)pentanoyl]amino]-1-piperidinyloxy Bromide (JWS-MITO-90)

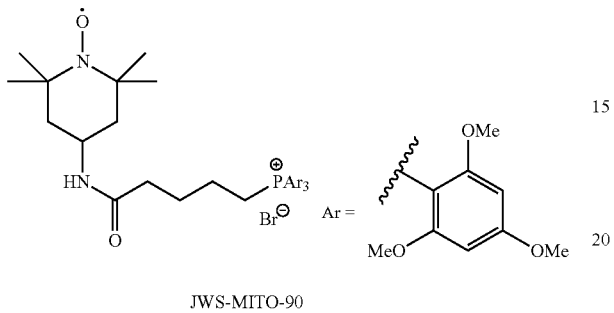

JWS-MITO-90

The compound was prepared according to the procedure for JWS-MITO-2. Light pink colored powder, yield 36%. MP 108-110° C. $^1$H NMR (400 MHz, CD$_2$Cl$_2$) δ 7.39 (s, 1H), 6.16 (d, J=4.6 Hz, 6H), 4.11 (dtd, J=10.7, 7.4, 6.7, 3.5 Hz, 1H), 3.90 (s, 9H), 3.65 (s, 18H), 3.07 (ddd, J=15.6, 9.8, 6.3 Hz, 2H), 2.22 (t, J=7.5 Hz, 2H), 1.84-1.68 (m, 4H), 1.57-1.31 (m, 4H), 1.18 (d, J=1.7 Hz, 12H). MS (LCMS): C$_{41}$H$_{59}$N$_2$O$_{11}$P$^{•+}$ requires: 786.38 found 786.54. $^{31}$P NMR δ 5.52.

Example 24. Synthesis of 2,2,6,6-Tetramethyl-4-[[4-(tri-2,4,6-trimethoxyphenyl4-phosphonia)butanoyl]amino]-1-piperidinyloxy Bromide (JWS-MITO-92)

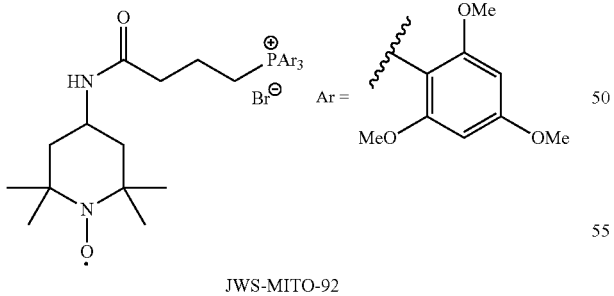

JWS-MITO-92

The compound was prepared according to the procedure for JWS-MITO-2. Light pink colored powder, yield 20%. MP 76-78° C. $^1$H NMR (400 MHz, CD$_2$Cl$_2$) δ 7.40 (s, 1H), 6.16 (d, J=4.5 Hz, 6H), 4.11 (m, 1H), 3.89 (s, 9H), 3.66 (s, 18H), 3.21-3.05 (m, 2H), 2.39 (t, J=7.2 Hz, 2H), 1.81-1.53 (m, 6H), 1.18 (d, J=3.1 Hz, 12H). MS (LCMS): C$_{40}$H$_{57}$N$_2$O$_{11}$P$^{•+}$ requires: 772.37 found 772.53. $^{31}$P NMR δ 5.35.

Example 25. Synthesis of 2,2,6,6-Tetramethyl-4-[[2-(tri-4-fluorophenylphosphonio)-acetyl]amino]-1-piperidinyloxy Chloride (JWS-MITO-94)

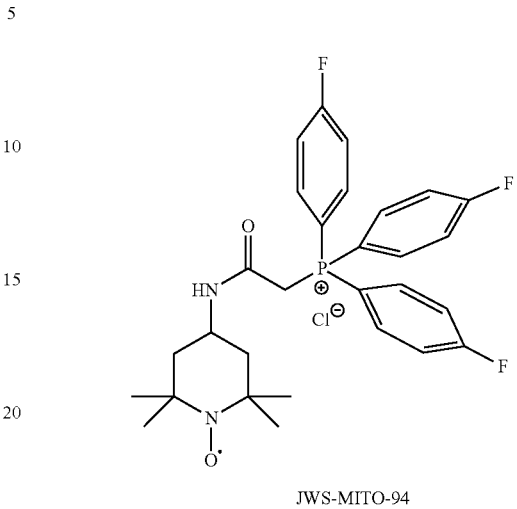

JWS-MITO-94

The compound was prepared according to the procedure for JWS-MITO-2. Light pink colored powder, yield 31%. MP 255-257° C. $^1$H NMR (400 MHz, CD$_2$Cl$_2$) δ 9.76 (d, J=7.4 Hz, 1H), 8.06-7.89 (m, 6H), 7.46-7.41 (m, 6H), 7.39 (s, 1H), 5.13 (s, 1H), 5.10 (s, 1H), 3.84 (dtt, J=11.8, 7.9, 4.0 Hz, 1H), 1.72-1.34 (m, 4H), 1.14 (s, 6H), 1.09 (s, 6H). MS (LCMS): C$_{29}$H$_{32}$F$_3$N$_2$O$_2$P$^{•+}$ requires: 528.21 found 528.29. $^{31}$P NMR δ 21.82.

Example 26. Synthesis of 2,2,6,6-Tetramethyl-4-[[2-(tri-4-chlorophenylphosphonio)acetyl]-amino]-1-piperidinyloxy Chloride (JWS-MITO-96)

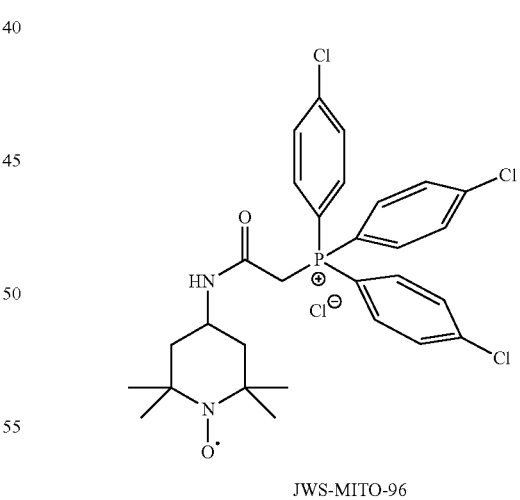

JWS-MITO-96

The compound was prepared according to the procedure for JWS-MITO-2. Light pink colored powder, yield 16%. MP 175-177° C. $^1$H NMR (400 MHz, CD$_2$Cl$_2$) δ 9.53 (d, J=7.5 Hz, 1H), 7.83-7.70 (m, 6H), 7.61-7.56 (m, 6H), 7.27 (s, 1H), 4.99 (s, 1H), 4.95 (s, 1H), 3.71 (tdt, J=11.8, 8.1, 4.3 Hz, 1H), 1.39-1.15 (m, 4H), 1.02 (s, 6H), 0.96 (s, 6H). MS (LCMS): C$_{29}$H$_{32}$Cl$_3$N$_2$O$_2$P$^{•+}$ requires: 577.91 found 578.14. $^{31}$P NMR δ 22.75.

Example 27. Compounds have been Tested for Mitochondrial Antioxidant Behavior and for Biological Activity Against Mitochondrial Oxidative Stress and Diastolic Dysfunction To test compounds for mitochondrial antioxidant behavior, the ROS-Glo Assay to assess superoxide dismutase activity of induced mitochondrial reactive oxygen species (mitoROS). In this assay, menadione is used to induce mitoROS production, and then a fluorophore is used to measure the resultant hydrogen peroxide levels. A higher level of hydrogen peroxide means more dismutase activity. Data representative of ROS-Glo Assay are shown in FIGS. 1, 2, 3, 4 and 5.

Figure 7:
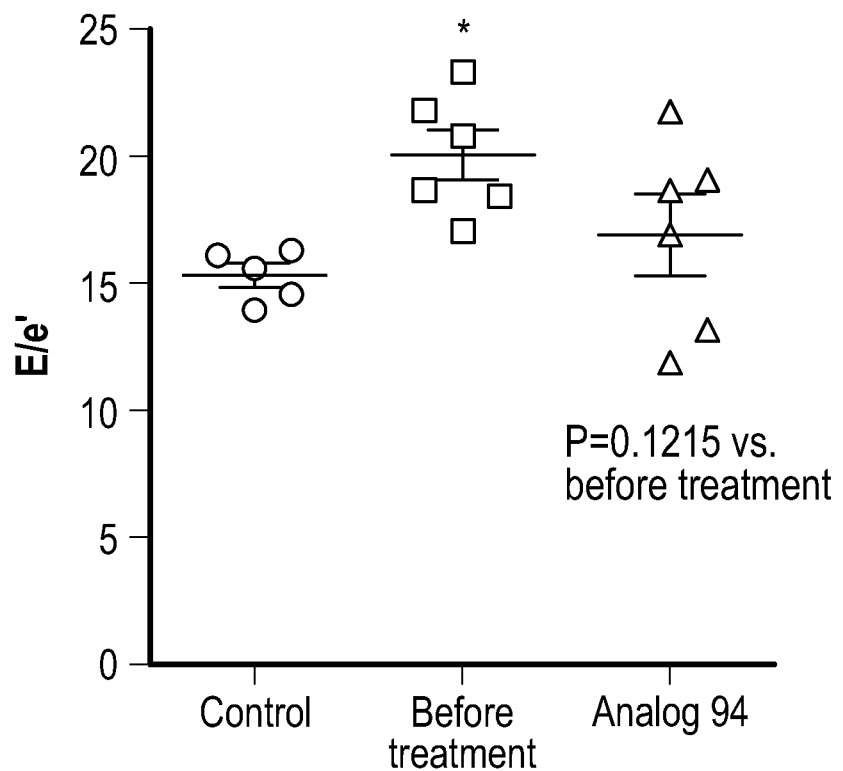
FIG. 7 shows that diabetes before treatment has evidence of diastolic dysfunction as measured by an elevated E/e' ratio compared to control mice. Diastolic dysfunction is treated by compound 94 given to diabetic mice. Compound 94 did not affect body weight or serum glucose as to diabetic animals before treatment.
Figure 7:
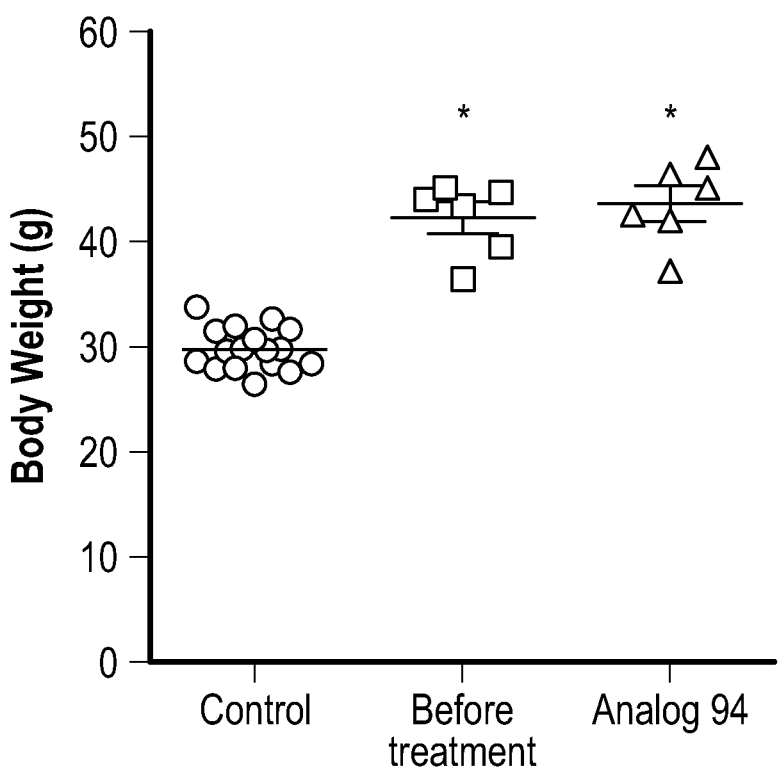
Figure 7:
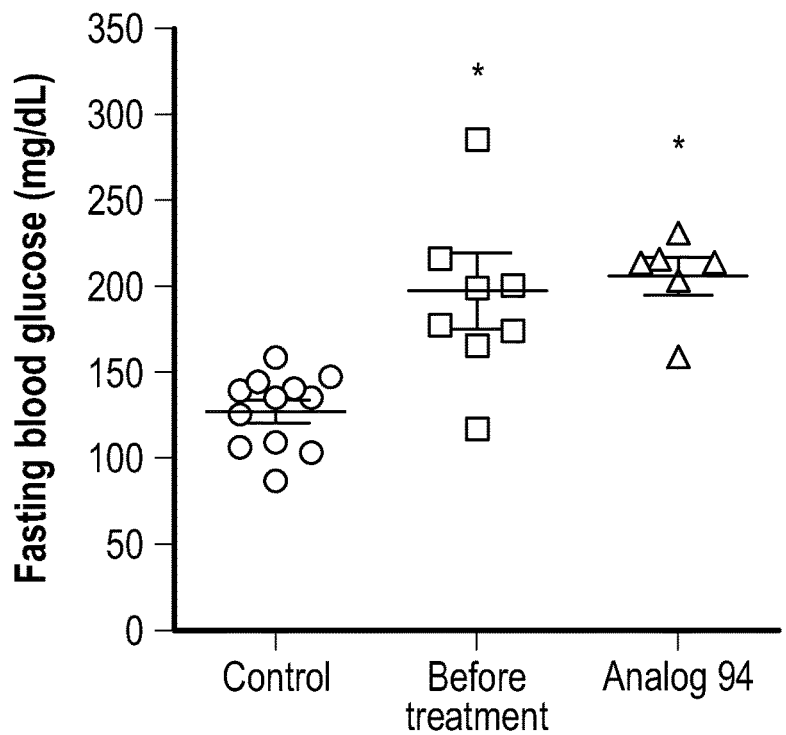
Figure 8:
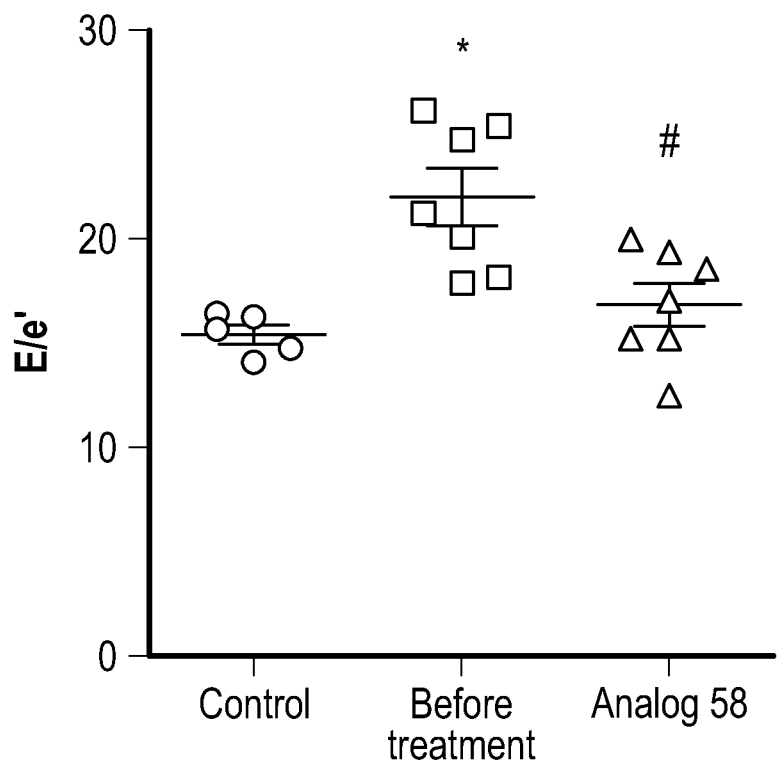
FIG. 8 shows that diabetes before treatment has evidence of diastolic dysfunction as measured by an elevated E/e' ratio compared to control mice. Diastolic dysfunction is treated by compound 58 given to diabetic mice. Neither serum glucose nor body weight were affected by compound 58 treatment.
Figure 8:
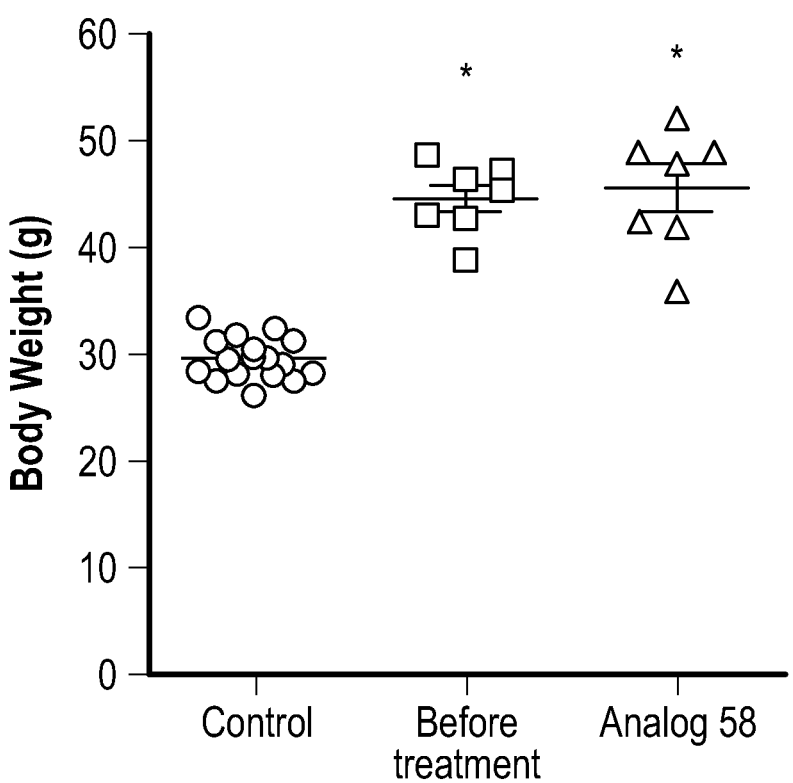
Figure 8:
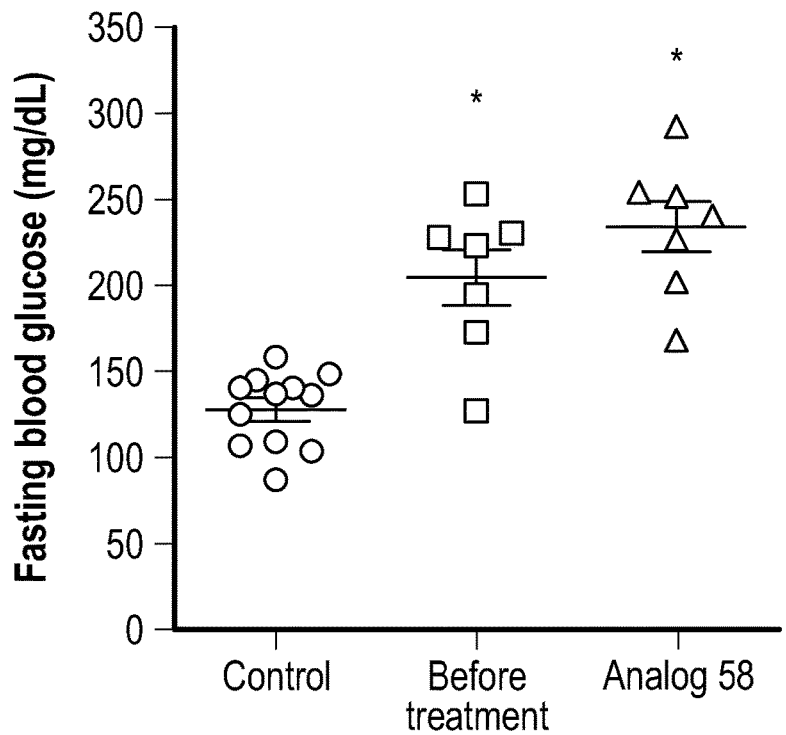
Figure 9:
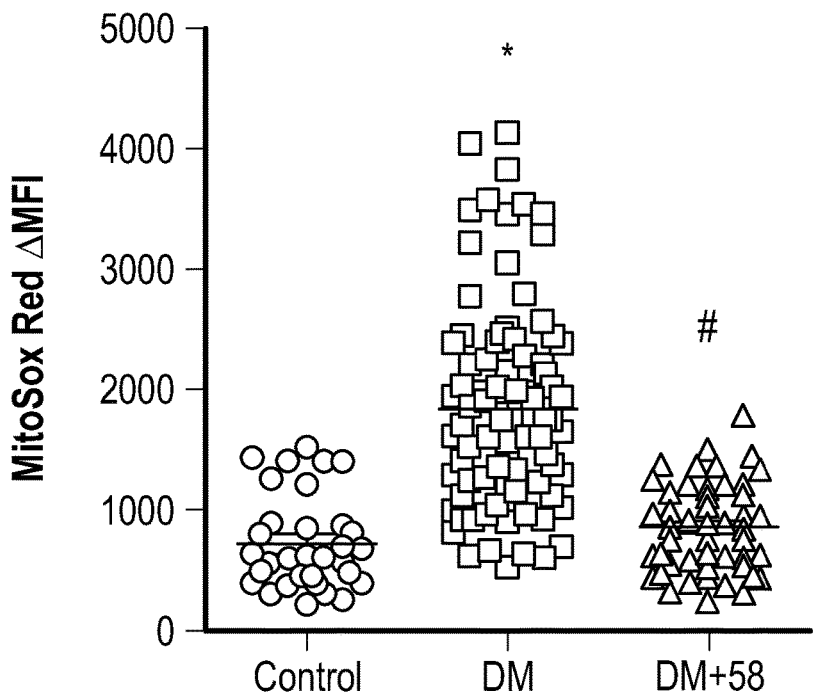
FIG. 9 shows that compound 58 treatment was able to reduces mitoROS in diabetic (DM) mice as measured by mitoSOX Red fluorescence.

To test compound activity against mitochondrial oxidative stress and diastolic dysfunction Mice were fed a high fat diet for 16 weeks starting at 6 weeks of age. Before treatment, fasting blood glucose (Gluc) and body weight were measured. Gluc was used to screen for diabetes mellitus (DM). Echocardiography was used to identify DD by measuring the E/e' ratio. Treatment of compounds 58 and 94 was 1 mg/kg/day for 2 weeks. Then, E/e' was reassessed. Data representative of this Assay are shown in FIGS. 7, 8 and 9.

Example 28. The Following Illustrate Representative Pharmaceutical Dosage Forms, Containing a Compound of Formula I ('Compound X'), for Therapeutic or Prophylactic Use in Humans

| (i) Tablet 1 | mg/tablet |
| --- | --- |
| Compound X= | 100.0 |
| Lactose | 77.5 |
| Povidone | 15.0 |
| Croscarmellose sodium | 12.0 |
| Microcrystalline cellulose | 92.5 |
| Magnesium stearate | 3.0 |
| | 300.0 |

| (ii) Tablet 2 | mg/tablet |
| --- | --- |
| Compound X= | 20.0 |
| Microcrystalline cellulose | 410.0 |
| Starch | 50.0 |
| Sodium starch glycolate | 15.0 |
| Magnesium stearate | 5.0 |
| | 500.0 |

| (iii) Capsule | mg/capsule |
| --- | --- |
| Compound X= | 10.0 |
| Colloidal silicon dioxide | 1.5 |
| Lactose | 465.5 |
| Pregelatinized starch | 120.0 |
| Magnesium stearate | 3.0 |
| | 600.0 |

| (iv) Injection 1 (1 mg/mL) | mg/ml |
| --- | --- |
| Compound X = (free acid form) | 1.0 |
| Dibasic sodium phosphate | 12.0 |
| Monobasic sodium phosphate | 0.7 |
| Sodium chloride | 4.5 |
| 1.0N Sodium hydroxide solution (pH adjustment to 7.0-7.5) | q.s. |
| Water for injection | q.s. ad 1 mL |

| (v) Injection 2 (10 mg/ml) | mg/ml |
| --- | --- |
| Compound X = (free acid form) | 10.0 |
| Monobasic sodium phosphate | 0.3 |
| Dibasic sodium phosphate | 1.1 |
| Polyethylene glycol 400 | 200.0 |
| 0.1N Sodium hydroxide solution (pH adjustment to 7.0-7.5) | q.s. |
| Water for injection | q.s. ad 1 mL |

| (vi) Aerosol | mg/can |
| --- | --- |
| Compound X= | 20.0 |
| Oleic acid | 10.0 |
| Trichloromonofluoromethane | 5,000.0 |
| Dichlorodifluoromethane | 10,000.0 |
| Dichlorotetrafluoroethane | 5,000.0 |

The above formulations may be obtained by conventional procedures well known in the pharmaceutical art.

All publications, patents, and patent documents are incorporated by reference herein, as though individually incorporated by reference. The invention has been described with reference to various specific and preferred embodiments and techniques. However, it should be understood that many variations and modifications may be made while remaining within the spirit and scope of the invention.

What is claimed is:

1. A compound of formula (I):

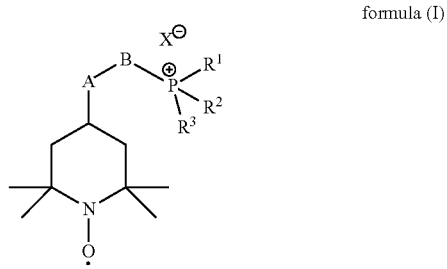

formula (I)

or a pharmaceutically acceptable salt thereof, wherein:
A is selected from —$NR^a$—, —S—, —OC(=O)—, —$NR^a$C(=O)—, —$NR^a$C(=S)—, —$NR^a$C(=O)O—, —$NR^a$C(=NH)$NR^b$—, —$NR^a$C(=O)$NR^b$—, —$NR^a$C(=S)$NR^b$—, —C(=O)O—, —C(=O)$NR^a$— and —C(=O)NH(S(O)$_2$)—;
B is ($C_1$-$C_{10}$)alkyl optionally substituted with one or more groups independently selected from the group consisting of halo and —OH;
X is a suitable counter anion;
$R^1$ is aryl that is optionally substituted with one or more groups independently selected from the group consisting of nitro, carboxy, halo, cyano, heteroaryl, aryl, ($C_1$-$C_6$)alkyl, ($C_3$-$C_6$)cycloalkyl, ($C_1$-$C_6$)alkoxy, ($C_2$-$C_6$)alkenyl, ($C_2$-$C_6$)alkynyl, ($C_1$-$C_6$)alkanoyl, ($C_1$-$C_6$)alkoxycarbonyl, ($C_1$-$C_6$)alkylthio, ($C_2$-$C_6$)alkanoyloxy, —OH, —NR$^a$R$^b$, —C(=O)NH($C_1$-$C_6$ alkyl)(S(O)$_2$R$^a$), —C(=O)NH($C_1$-$C_6$ alkyl)(C(=O) OR$^a$), —C(=O)NR$^a$R$^b$, —OS(O)$_3$R$^a$, —C(=O)NH(S(O)$_2$R$^a$), and —C(=O)($C_1$-$C_6$ alkyl), wherein any heteroaryl, aryl, ($C_1$-$C_6$)alkyl, ($C_3$-$C_6$)cycloalkyl, ($C_1$-$C_6$)alkoxy, ($C_2$-$C_6$)alkenyl, ($C_2$-$C_6$)alkynyl, ($C_1$-$C_6$)alkanoyl, ($C_1$-$C_6$)alkoxycarbonyl, ($C_1$-$C_6$)alkylthio and ($C_2$-$C_6$)alkanoyloxy is optionally substituted with one or more groups independently selected from the group consisting of halo, carboxy, —OH and cyano;

R$^2$ is aryl that is optionally substituted with one or more groups independently selected from the group consisting of nitro, carboxy, halo, cyano, heteroaryl, aryl, ($C_1$-$C_6$)alkyl, ($C_3$-$C_6$)cycloalkyl, ($C_1$-$C_6$)alkoxy, ($C_2$-$C_6$)alkenyl, ($C_2$-$C_6$)alkynyl, ($C_1$-$C_6$)alkanoyl, ($C_1$-$C_6$)alkoxycarbonyl, ($C_1$-$C_6$)alkylthio, ($C_2$-$C_6$)alkanoyloxy, —OH, —NR$^a$R$^b$, —C(=O)NH($C_1$-$C_6$ alkyl)(S(O)$_2$R$^a$), —C(=O)NH($C_1$-$C_6$ alkyl)(C(=O) OR$^a$), —C(=O)NR$^a$R$^b$, —OS(O)$_3$R$^a$, —C(=O)NH(S(O)$_2$R$^a$), and —C(=O)($C_1$-$C_6$ alkyl), wherein any heteroaryl, aryl, ($C_1$-$C_6$)alkyl, ($C_3$-$C_6$)cycloalkyl, ($C_1$-$C_6$)alkoxy, ($C_2$-$C_6$)alkenyl, ($C_2$-$C_6$)alkynyl, ($C_1$-$C_6$)alkanoyl, ($C_1$-$C_6$)alkoxycarbonyl, ($C_1$-$C_6$)alkylthio and ($C_2$-$C_6$)alkanoyloxy is optionally substituted with one or more groups independently selected from the group consisting of halo, carboxy, —OH and cyano;

R$^3$ is aryl that is optionally substituted with one or more groups independently selected from the group consisting of nitro, carboxy, halo, cyano, heteroaryl, aryl, ($C_1$-$C_6$)alkyl, ($C_3$-$C_6$)cycloalkyl, ($C_1$-$C_6$)alkoxy, ($C_2$-$C_6$)alkenyl, ($C_2$-$C_6$)alkynyl, ($C_1$-$C_6$)alkanoyl, ($C_1$-$C_6$)alkoxycarbonyl, ($C_1$-$C_6$)alkylthio, ($C_2$-$C_6$)alkanoyloxy, —OH, —NR$^a$R$^b$, —C(=O)NH($C_1$-$C_6$ alkyl)(S(O)$_2$R$^a$), —C(=O)NH($C_1$-$C_6$ alkyl)(C(=O) OR$^a$), —C(=O)NR$^a$R$^b$, —OS(O)$_3$R$^a$, —C(=O)NH(S(O)$_2$R$^a$), and —C(=O) ($C_1$-$C_6$ alkyl), wherein any heteroaryl, aryl, ($C_1$-$C_6$)alkyl, ($C_3$-$C_6$)cycloalkyl, ($C_1$-$C_6$)alkoxy, ($C_2$-$C_6$)alkenyl, ($C_2$-$C_6$)alkynyl, ($C_1$-$C_6$)alkanoyl, ($C_1$-$C_6$)alkoxycarbonyl, ($C_1$-$C_6$)alkylthio and ($C_2$-$C_6$)alkanoyloxy is optionally substituted with one or more groups independently selected from the group consisting of halo, carboxy, —OH and cyano; and each R$^a$ and R$^b$ is independently selected from the group consisting of H, aryl, heteroaryl, ($C_1$-$C_6$)alkyl and ($C_3$-$C_6$)cycloalkyl wherein any aryl, heteroaryl, ($C_1$-$C_6$)alkyl, and ($C_3$-$C_6$)cycloalkyl, is optionally substituted with one or more groups independently selected from the group consisting of halo, nitro, —OH, cyano,; or R$^a$ and R$^b$ together with the nitrogen to which they are attached form a 4-10 membered ring heterocycle.

2. The compound or pharmaceutically acceptable salt of claim 1, wherein A is —NR$^a$C(=O)— wherein R$^a$ is independently selected from the group consisting of H, aryl, heteroaryl, ($C_1$-$C_6$)alkyl and ($C_3$-$C_6$)cycloalkyl wherein any aryl, heteroaryl, ($C_1$-$C_6$)alkyl, and ($C_3$-$C_6$)cycloalkyl, is optionally substituted with one or more groups independently selected from the group consisting of halo, nitro, —OH, cyano.

3. The compound or pharmaceutically acceptable salt of claim 1, wherein A is —NHC(=O)—.

4. The compound or pharmaceutically acceptable salt of claim 1, wherein B is ($C_1$-$C_{10}$)alkyl.

5. The compound or pharmaceutically acceptable salt of claim 1, wherein B is methyl, ethyl, n-propyl, n-butyl, n-pentyl or n-hexyl.

6. The compound or pharmaceutically acceptable salt of claim 1, wherein X is halogen.

7. The compound or pharmaceutically acceptable salt of claim 1, wherein X is Cl.

8. The compound or pharmaceutically acceptable salt of claim 1, wherein X is Br.

9. The compound or pharmaceutically acceptable salt of claim 1, wherein R$^1$ is phenyl substituted with one or more groups independently selected from the group consisting of nitro, carboxy, halo, cyano, heteroaryl, aryl, ($C_1$-$C_6$)alkyl, ($C_3$-$C_6$)cycloalkyl, ($C_1$-$C_6$)alkoxy, ($C_2$-$C_6$)alkenyl, ($C_2$-$C_6$)alkynyl, ($C_1$-$C_6$)alkanoyl, ($C_1$-$C_6$)alkoxycarbonyl, ($C_1$-$C_6$)alkylthio, ($C_2$-$C_6$)alkanoyloxy, —OH, —NR$^a$R$^b$, —C(=O)NH($C_1$-$C_6$ alkyl)(S(O)$_2$R$^a$), —C(=O)NH($C_1$-$C_6$ alkyl)(C(=O) OR$^a$), —C(=O)NR$^a$R$^b$, —OS(O)$_3$R$^a$, —C(=O)NH(S(O)$_2$R$^a$), and —C(=O) ($C_1$-$C_6$ alkyl), wherein any heteroaryl, aryl, ($C_1$-$C_6$)alkyl, ($C_3$-$C_6$)cycloalkyl, ($C_1$-$C_6$)alkoxy, ($C_2$-$C_6$)alkenyl, ($C_2$-$C_6$)alkynyl, ($C_1$-$C_6$)alkanoyl, ($C_1$-$C_6$)alkoxycarbonyl, ($C_1$-$C_6$)alkylthio and ($C_2$-$C_6$)alkanoyloxy is optionally substituted with one or more groups independently selected from the group consisting of halo, carboxy, —OH and cyano.

10. The compound or pharmaceutically acceptable salt of claim 1, wherein R$^1$ is 4-fluorophenyl, 3-fluorophenyl, 4-methylphenyl, 4-chlorophenyl, 2-tri(methoxy)phenyl, 2,4,6-(methoxy)phenyl, 3-(methoxy)phenyl or 4-(methoxy)phenyl.

11. The compound or pharmaceutically acceptable salt of claim 9, wherein R$^2$ is phenyl optionally substituted with one or more groups independently selected from the group consisting of nitro, carboxy, halo, cyano, heteroaryl, aryl, ($C_1$-$C_6$)alkyl, ($C_3$-$C_6$)cycloalkyl, ($C_1$-$C_6$)alkoxy, ($C_2$-$C_6$)alkenyl, ($C_2$-$C_6$)alkynyl, ($C_1$-$C_6$)alkanoyl, ($C_1$-$C_6$)alkoxycarbonyl, ($C_1$-$C_6$)alkylthio, ($C_2$-$C_6$)alkanoyloxy, —OH, —NR$^a$R$^b$, —C(=O)NH($C_1$-$C_6$ alkyl)(S(O)$_2$R$^a$), —C(=O)NH($C_1$-$C_6$ alkyl)(C(=O) OR$^a$), —C(=O)NR$^a$R$^b$, —OS(O)$_3$ R$^a$, —C(=O)NH(S(O)$_2$R$^a$), and —C(=O) ($C_1$-$C_6$ alkyl), wherein any heteroaryl, aryl, ($C_1$-$C_6$)alkyl, ($C_3$-$C_6$)cycloalkyl, ($C_1$-$C_6$)alkoxy, ($C_2$-$C_6$)alkenyl, ($C_2$-$C_6$)alkynyl, ($C_1$-$C_6$)alkanoyl, ($C_1$-$C_6$)alkoxycarbonyl, ($C_1$-$C_6$)alkylthio and ($C_2$-$C_6$)alkanoyloxy is optionally substituted with one or more groups independently selected from the group consisting of halo, carboxy, —OH and cyano.

12. The compound or pharmaceutically acceptable salt of claim 10, wherein R$^2$ is 4-fluorophenyl, 3-fluorophenyl, 4-methylphenyl, 4-chlorophenyl, 2-(methoxy)phenyl, 2,4,6-(methoxy)phenyl, 3-(methoxy)phenyl or 4-(methoxy)phenyl.

13. The compound or pharmaceutically acceptable salt of claim 1, wherein R$^2$ is phenyl.

14. The compound or pharmaceutically acceptable salt of claim 11, wherein R$^3$ is phenyl optionally substituted with one or more groups independently selected from the group consisting of nitro, carboxy, halo, cyano, heteroaryl, aryl, ($C_1$-$C_6$)alkyl, ($C_3$-$C_6$)cycloalkyl, ($C_1$-$C_6$)alkoxy, ($C_2$-$C_6$)alkenyl, ($C_2$-$C_6$)alkynyl, ($C_1$-$C_6$)alkanoyl, ($C_1$-$C_6$)alkoxycarbonyl, ($C_1$-$C_6$)alkylthio, ($C_2$-$C_6$)alkanoyloxy, —OH, —NR$^a$R$^b$, —C(=O)NH($C_1$-$C_6$ alkyl)(S(O)$_2$R$^a$), —C(=O)NH($C_1$-$C_6$ alkyl)(C(=O)OR$^a$), —C(=O)NR$^a$R$^b$, —OS(O)$_3$ R$^a$, —C(=O)NH(S(O)$_2$R$^a$), and —C(=O) ($C_1$-$C_6$ alkyl), wherein any heteroaryl, aryl, ($C_1$-$C_6$)alkyl, ($C_3$-$C_6$)cycloalkyl, ($C_1$-$C_6$)alkoxy, ($C_2$-$C_6$)alkenyl, ($C_2$-$C_6$)alkynyl, ($C_1$-$C_6$)alkanoyl, ($C_1$-$C_6$)alkoxycarbonyl, ($C_1$-$C_6$)alkylthio and ($C_2$-$C_6$)alkanoyloxy is optionally substituted with one or more groups independently selected from the group consisting of halo, carboxy, —OH and cyano.

15. The compound or pharmaceutically acceptable salt of claim 12, wherein R³ is 4-fluorophenyl, 3-fluorophenyl, 4-methylphenyl, 4-chlorophenyl, 2-(methoxy)phenyl, 2,4,6-(methoxy)phenyl, 3-(methoxy)phenyl or 4-(methoxy)phenyl.

16. The compound or pharmaceutically acceptable salt of claim 13, wherein R³ is phenyl.

17. The compound of claim 1, which is selected from:

JWS-MITO-2

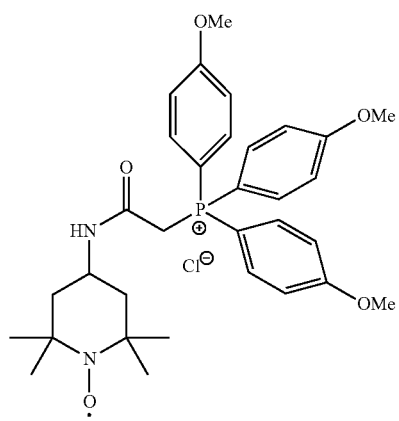

JWS-MITO-4

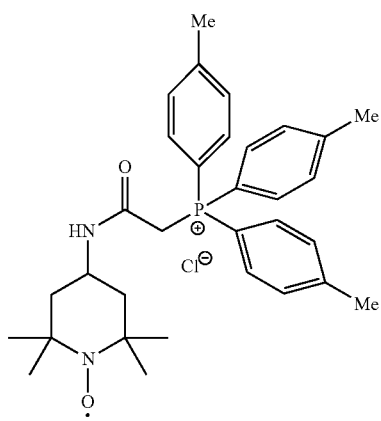

JWS-MITO-6

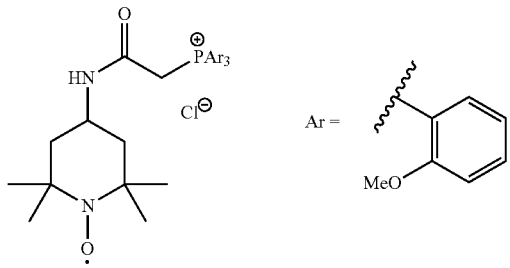

JWS-MITO-18

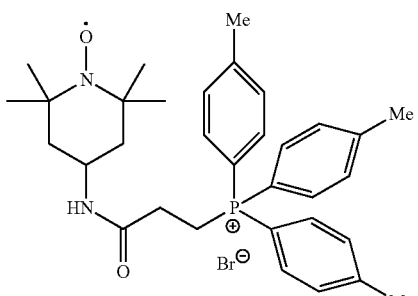

JWS-MITO-40

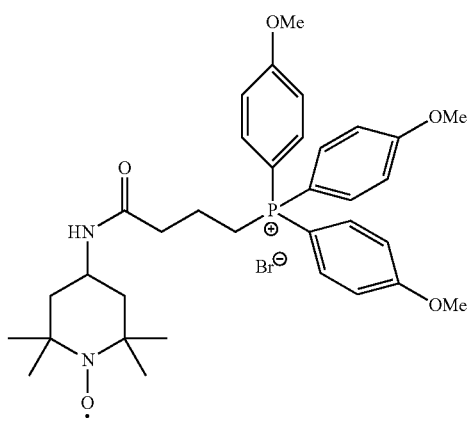

JWS-MITO-50

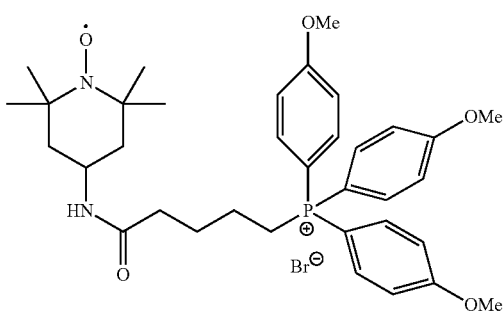

JWS-MITO-58

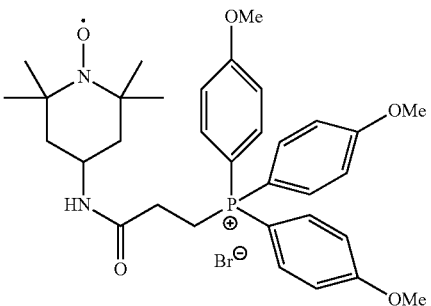

33
-continued
34
-continued
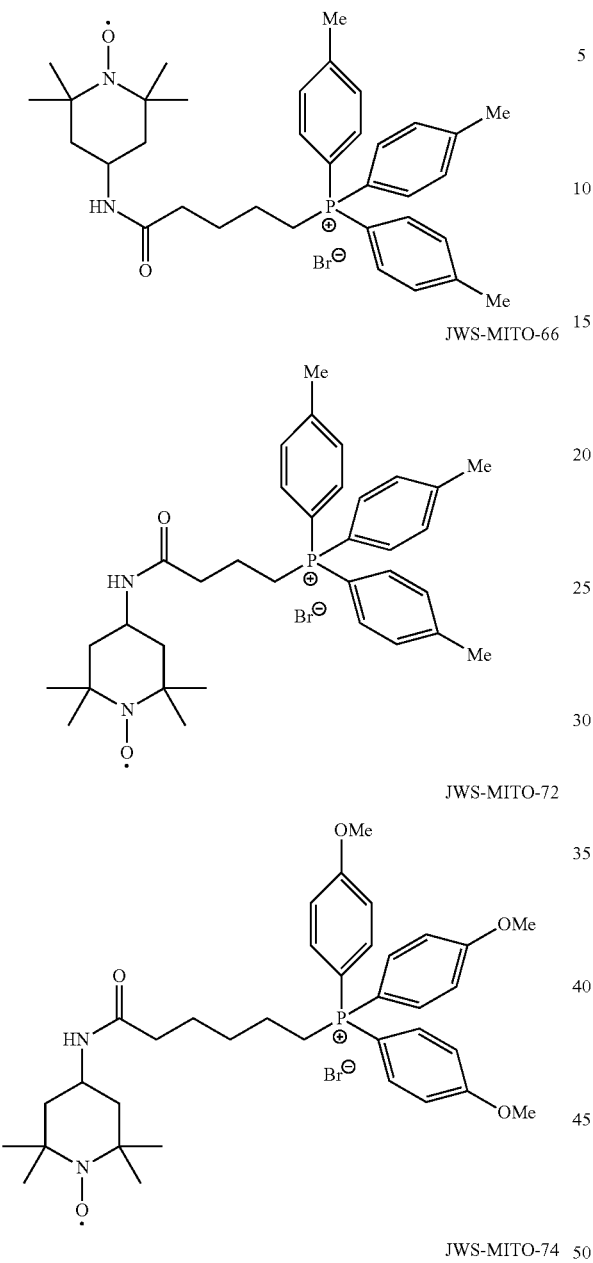
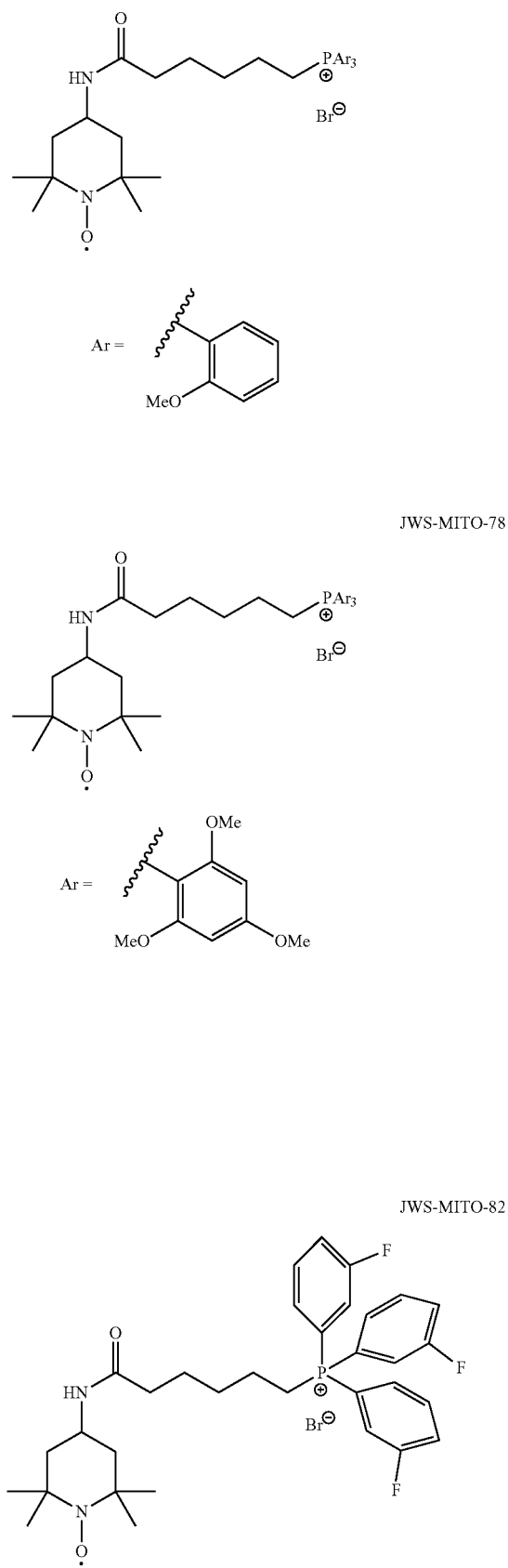

JWS-MITO-84
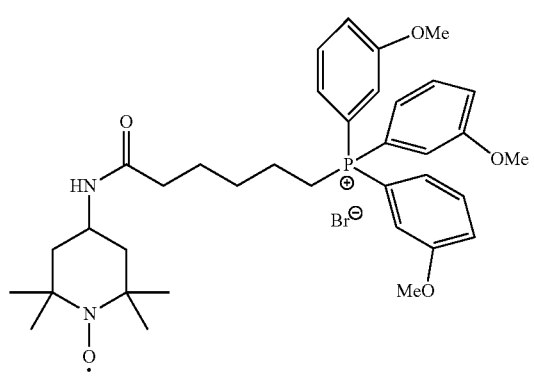
JWS-MITO-86
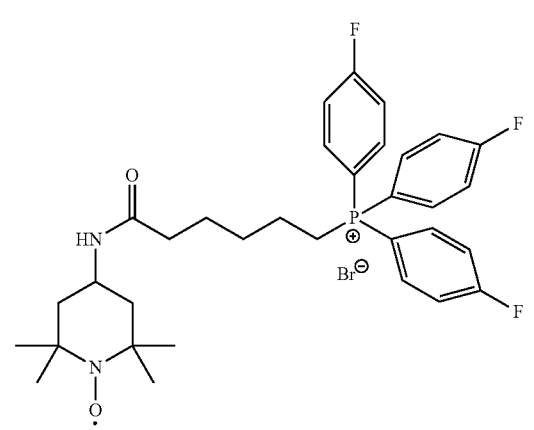
JWS-MITO-88
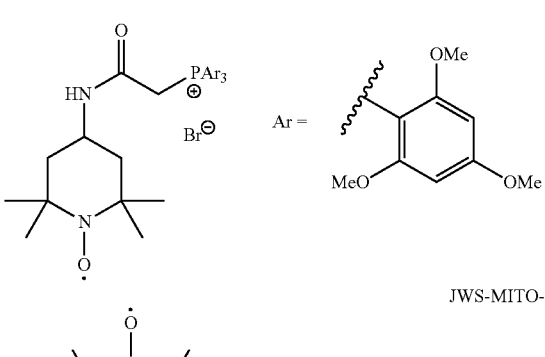
JWS-MITO-90
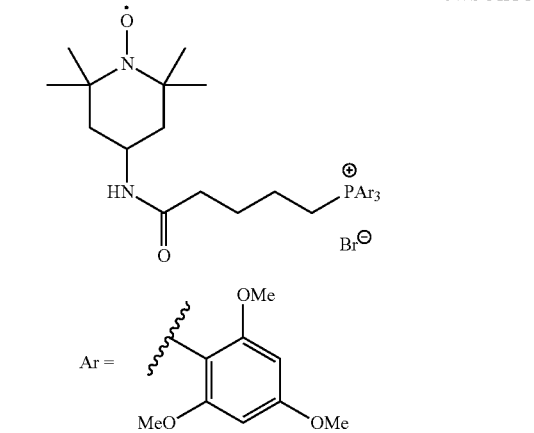
JWS-MITO-92
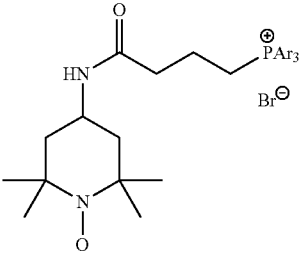
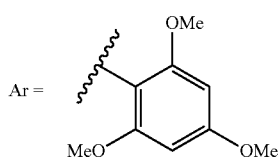
JWS-MITO-94
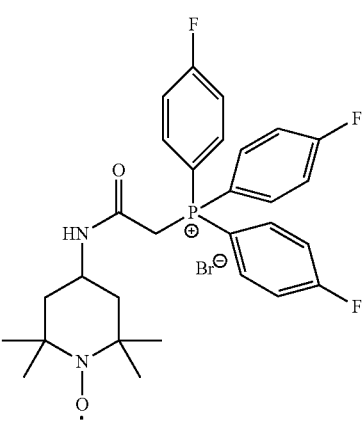
and
JWS-MITO-96
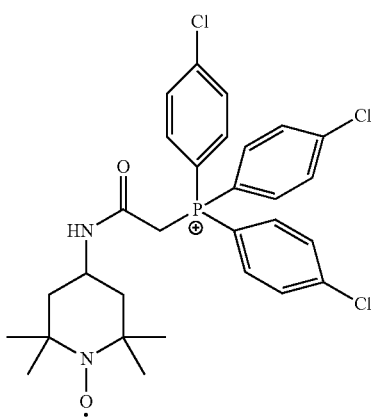
or a pharmaceutically acceptable salt thereof.
18. A pharmaceutical composition comprising a compound as described in claim 1 or a pharmaceutically acceptable salt thereof, and a pharmaceutically acceptable excipient.
* * * * *